United States Patent
Murialdo

(10) Patent No.: US 12,476,822 B2
(45) Date of Patent: Nov. 18, 2025

(54) DIFFERENTIATION BETWEEN HUMAN-GENERATED AND AI-GENERATED TEXT

(71) Applicant: Lawrence Livermore National Security, LLC, Livermore, CA (US)

(72) Inventor: Maxwell Robert Murialdo, San Francisco, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 203 days.

(21) Appl. No.: 18/327,453

(22) Filed: Jun. 1, 2023

(65) Prior Publication Data

US 2024/0406003 A1 Dec. 5, 2024

(51) Int. Cl.
*H04L 9/32* (2006.01)
*H04L 9/08* (2006.01)

(52) U.S. Cl.
CPC .......... *H04L 9/3247* (2013.01); *H04L 9/0877* (2013.01)

(58) Field of Classification Search
CPC ............................ H04L 9/3247; H04L 9/0877
See application file for complete search history.

(56) References Cited

U.S. PATENT DOCUMENTS

| | | | |
|---|---|---|---|
| 5,586,085 A * | 12/1996 | Lichte | G01F 25/20 367/908 |
| 7,701,364 B1 | 4/2010 | Zilberman | |
| 7,721,107 B2 | 5/2010 | Golle et al. | |
| 8,271,791 B2 * | 9/2012 | Buhler | H04L 9/3234 706/26 |
| 8,332,932 B2 | 12/2012 | Kellas-dicks et al. | |
| 8,766,823 B2 | 7/2014 | Zilberman | |
| 8,832,461 B2 | 9/2014 | Saroiu et al. | |
| 8,843,754 B2 | 9/2014 | Alward et al. | |

(Continued)

FOREIGN PATENT DOCUMENTS

| | | |
|---|---|---|
| CN | 101937496 B | 8/2014 |
| KR | 20190101120 A | 8/2019 |
| WO | 2015196970 A1 | 12/2015 |

OTHER PUBLICATIONS

Ladd, Watson, "Introducing Zero-Knowledge Proofs for Private Web Attestation with Cross/Multi-Vendor Hardware," Cloudflare, 2021.

(Continued)

*Primary Examiner* — Abu S Sholeman
(74) *Attorney, Agent, or Firm* — Perkins Coie LLP

(57) ABSTRACT

A method of distinguishing between human-generated text and text generated by artificial intelligence (AI) is disclosed. A plurality of first cryptographic digital signatures associated with a set of typed characters are generated. Generating the plurality of first cryptographic digital signatures may include, for each of multiple keystrokes on a physical keyboard: detecting a motion associated with a pressing of a particular key on the physical keyboard, wherein the particular key is associated with a particular character; generating a first cryptographic digital signature associated with the particular character in response to detecting the motion; and providing a typed character and an associated one of the first cryptographic digital signatures to a first verification entity located within a processing device, for verification of a physical keystroke.

31 Claims, 13 Drawing Sheets

(56) References Cited

U.S. PATENT DOCUMENTS

| | | | |
|---|---|---|---|
| 10,152,581 B2 | 12/2018 | Hamid | |
| 10,187,211 B2 | 1/2019 | Joyce | |
| 10,402,089 B2 | 9/2019 | Berger et al. | |
| 10,693,661 B1 | 6/2020 | Hamlet | |
| 11,436,310 B1 | 9/2022 | Tenaglia et al. | |
| 2002/0026575 A1 | 2/2002 | Wheeler et al. | |
| 2006/0261983 A1* | 11/2006 | Griffin | H01H 13/84 |
| | | | 341/27 |
| 2009/0096751 A1* | 4/2009 | Ross | G06F 3/04886 |
| | | | 345/168 |
| 2013/0254542 A1* | 9/2013 | Buer | H04L 9/0877 |
| | | | 713/168 |
| 2014/0181529 A1* | 6/2014 | Joyce, III | G06F 21/83 |
| | | | 726/5 |
| 2015/0277580 A1* | 10/2015 | Kumar | G06F 1/1626 |
| | | | 345/172 |
| 2018/0075010 A1 | 3/2018 | He | |
| 2019/0265781 A1* | 8/2019 | Kehoe | G06F 3/0304 |
| 2023/0111701 A1 | 4/2023 | Moon et al. | |

OTHER PUBLICATIONS

Whalen, Tara, et al., "Let The Right One In: Attestation as a Usable CAPTCHA Alternative," Cusenix, The Advanced Computing Systems Association, Proceedings of the Eighteenth Symposium on Usable Privacy and Security (SOUPS 2022).

International Search Report and Written Opinion Received in Application No. PCT/US24/32218, dated Sep. 24, 2024, 8 pages.

\* cited by examiner

Generate cryptographic digital signatures associated with a set of typed characters

800

Detect a physical motion associated with a pressing of a particular physical key on the physical keyboard, wherein the particular physical key is associated with a particular character
801

Generate a first cryptographic digital signature associated with the particular character in response to detecting the physical motion associated with the pressing of the particular physical key
802

Provide a typed character and an associated one of the first cryptographic digital signatures to a first verification entity located within the first processing device, for verification of a physical keystroke
803

```
┌─────────────────────────────────────────────────┐
│ Obtain a plurality of first cryptographic digital│
│ signatures associated with a set of typed        │
│ characters                                       │
│ 1001                                             │
└─────────────────────────────────────────────────┘
                      │
                      ▼
┌─────────────────────────────────────────┐
│ Verify each of the first cryptographic  │
│ digital signatures                      │
│ 1002                                    │
└─────────────────────────────────────────┘
                      │
                      ▼
              ╱ All         ╲
             ╱ signatures    ╲ ──No──▶  ┌──────────────────────┐
             ╲ successfully  ╱          │ Output error message │
              ╲ verified    ╱           │ 1007                 │
               ╲ 1003      ╱            └──────────────────────┘
                ╲   ?    ╱
                      │
                     Yes
                      ▼
┌─────────────────────────────────────────┐
│ Generate hash of typed characters       │
│ 1004                                    │
└─────────────────────────────────────────┘
                      │
                      ▼
┌─────────────────────────────────────────┐
│ Generate digital signature of the hash  │
│ 1005                                    │
└─────────────────────────────────────────┘
                      │
                      ▼
┌─────────────────────────────────────────┐
│ Send hash and digital signature to      │
│ verification party                      │
│ 1006                                    │
└─────────────────────────────────────────┘
```

FIG. 10

DIFFERENTIATION BETWEEN HUMAN-GENERATED AND AI-GENERATED TEXT

STATEMENT REGARDING FEDERALLY SPONSORED RESEARCH

The techniques introduced here was made with Government support under Contract No. DE-AC52-07NA27344 awarded by the United States Department of Energy. The Government has certain rights in the invention.

FIELD

The techniques introduced here generally pertain to techniques for distinguishing between human-generated text and text generated by artificial intelligence (AI), and more particularly, to cryptographic techniques for verifying that data stored on a computer system was produced by the physical typing of that data.

BACKGROUND

Generative Artificial Intelligence (AI) is undergoing rapid development and threatening to upend norms on the Internet and in classrooms. Generative AI (GenAI) programs such as ChatGPT can generate text (and other data) that is largely indistinguishable from text generated by humans. Unlike humans, however, GenAI programs can generate text at volumes and speeds that are many orders of magnitude larger than what a single human could achieve. However, AI generated text currently is of variable quality. Therefore, there is a risk that AI generated text will come to dominate online text and discourse while drowning out text generated by humans. This has the potential to drown out the voices, opinions, and thinking of real humans while simultaneously enabling the proliferation of online deception and manipulation (for example: fake news or fake opinions). Similarly, GenAI can be used to cheat on writing assignments in education and evaluation settings, among other use cases.

BRIEF DESCRIPTION OF THE DRAWINGS

One or more embodiments of the techniques introduced here are illustrated by way of example and not limitation in the figures of the accompanying drawings, in which like references indicate similar elements.

FIG. 8 is a flow diagram illustrating an example of an overall process that may be performed by an HSM in a keyboard in accordance with the techniques introduced here.

FIG. 10 is a flow diagram illustrating an example of an overall process that may be performed by the local verification entity in a host computer to which a keyboard is connected or of which the keyboard is a part.

DETAILED DESCRIPTION

Figure 1:
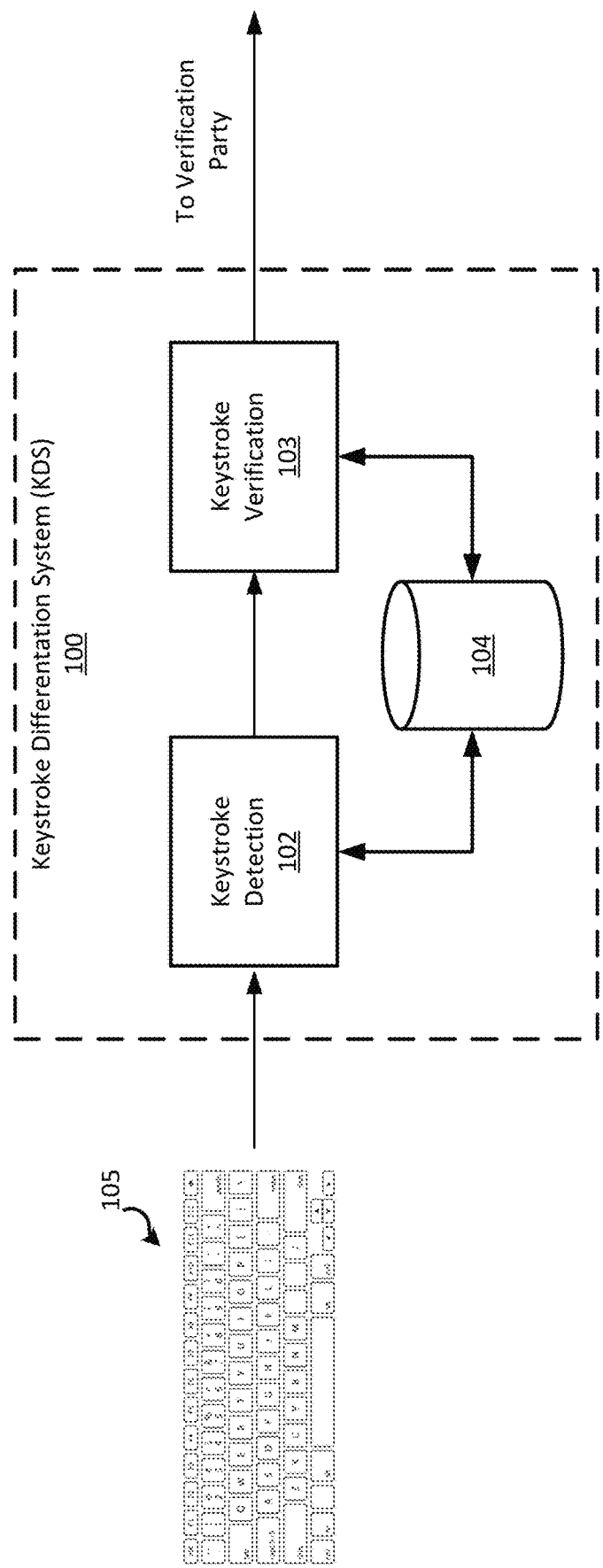
FIG. 1 illustrates an example of a Keystroke Differentiation System (KDS) in accordance with the techniques introduced herein.

In this description, references to "an embodiment", "one embodiment" or the like, mean that the particular feature, function, structure or characteristic being described is included in at least one embodiment of the techniques introduced here. Occurrences of such phrases in this specification do not necessarily all refer to the same embodiment. On the other hand, the embodiments referred to also are not necessarily mutually exclusive.

In view of the above-mentioned issues, there is a need for a way to differentiate between text typed by a human and AI-generated text. There are various possibilities for doing this, most if not all of which have one or more shortcomings.

One possibility is to test for the complexity and burstiness of a text to attempt to detect AI writing. It is thought that this method will fail rapidly as generative AI text generators advance over the next couple of years. AI generated text will quickly become indistinguishable from humans in writing style.

Another possibility is to watermark or otherwise identify all text that is generated by every AI that exists. It is thought that this method will quickly become untenable. It has already been shown that a new large language model can be created and trained for less than $1000. This means that the technology for large language models cannot be constrained to a few controlled companies but will instead proliferate. Bad actors can relatively inexpensively create their own models that do not contain watermarks or restrictions. Therefore, the idea to watermark all AI generated text is likely to be a short-lived solution.

A third possibility is to identify and tag text that is human generated. This approach arguably leads to the most robust solution that will have longevity, which is the solution applied in the techniques introduced herein. The techniques introduced herein use physical hardware and cryptography to differentiate between human generated text (i.e., text typed by a human) and AI generated text. The techniques introduced herein can be used to validate that text is likely to be human generated for the purposes of sorting or gatekeeping on the Internet, can detect cheating on essay assignments, and can be used as a form of automatic CAPTCHA (Completely Automated Public Turing test to tell Computers and Humans Apart) that does away with the hassle of traditional CAPTCHAs.

CAPTCHAs are measures that help to distinguish between a human and a computer (bot or algorithm) online.

CAPTCHAs are a vital security measure online. They generally function by leveraging the skill gap between what humans can easily do and what a computer or algorithm can easily do. Traditional CAPTCHAs often take the form of a test or puzzle that a human can solve quickly but is difficult to automate an algorithm to solve. These tests or puzzles can involves reading poorly written letters or numbers, looking for objects in a photo or series of photos, orienting objects as they belong, etc. Recently, a company has designed a physical CAPTCHA to replace other burdensome CAPTCHA activities. In the physical CAPTCHA design, a physical universal serial bus (USB) key must be physically touched on its capacitive sensor to activate the process of generating a digital signature within a hardware security module (HSM). The HSM contains a private key, anti-tamper measures, and the digital signature can only be created if the capacitance sensor is triggered. Therefore, its use provides a likelihood that a human initiated the generation of this digital signature. However, an automatic device, such as a drinking bird toy, could potentially be used to trigger the capacitive sensor instead of a human. The physical CAPTCHA process can be referred to as cryptographic attestation of personhood (CAP).

In attempting to differentiate between human-generated text and AI-generated text, it is important to have a way to detect the physical act of actuating physical keys on a keyboard. That is because it is difficult and expensive to replicate physical typing by use of robotics. Furthermore, it is more difficult to create a robot that physically moves than to create something that only generates an electric or magnetic field, which in turn is more difficult that simply replicating or spoofing digital signals. Accordingly, the techniques introduced here are based on detection of physical typing.

I. Definitions

The following terms and definitions apply in this description:

Associated data: Data that is associated with typing, including but not limited to the key that is being pressed. Associated data can include data regarding the time and date when the key was pressed, sensor data related to how the key or a set of keys has been pressed, data regarding recently typed data on the same system, data concerning the context or application for which the typed data was designated at the time of typing, and even biometric data regarding the identity of the person doing the typing. Associated data can also include random or pseudorandom data that is generated internally within a host computer or received from an external source (e.g., transmitted by an external party or downloaded from an external party).

Cryptographic module: The electronics, and in at least some embodiments, software, that take inputs such as the associated data and triggering signals and generate the digital signature as an output.

Hardware security module (HSM): A device that includes a cryptographic module and a housing that contains the cryptographic module. The housing typically serves as an anti-tamper layer to protect the cryptographic module. An HSM also can contain sensors to detect motion of one or more physical keys, a trusted clock and/or other electronics.

Human-Computer Text/Typed Data Input Interface: An interface by which a human can input text information into a computer system by the act of typing (here defined as the act of touching the system using one's fingers such that the location of the touch triggers a specific action or the recording of specific information within the computer system).

Keystroke level digital signature: A digital signature that is generated by a hardware security module and private key embedded in a physical keyboard (often below the physical key that is being pressed). This digital signature can only be generated by the physical act of pressing a keyboard key. Each keystroke level digital signature is associated with a press of a key on the keyboard. Each keystroke level digital signature is an identifier of the specific key or set of keys that were pressed. The keystroke level digital signature can be generated using symmetric or asymmetric cryptography. In either case a private key (a cryptographic key that should be held secret or private) is used for the generation of the digital signature.

Priming: "Priming" is the act of sending associated data into a cryptographic module and preparing the cryptographic module to receive a triggering signal.

Text: Any typed data, which can include characters or symbols of any language and/or numerals of any numbering system.

User/hardware level digital signature: A digital signature that can be applied by a computer or keyboard hardware or software to validate an entire document or set of data (using a hardware private key). This digital signature is associated with a specific piece of hardware (not fully anonymous).

Verification party: A trusted third party that can validate whether or not a digital signature associated with a specific piece of hardware that uses the system is authorized. The verification party can make this assessment using public key cryptography. The verification party can determine whether the public key associated with the digital signature is on a list of authorized public keys or if the public key has itself been digitally signed by a trusted manufacturer. The public key associated with the digital signature can be provided by the sending party for convenience. The verification party (also called third-party verification entity) will receive plaintext, hashed, or encrypted data from a user's computer system, perform basic checks on that data, and if those checks are passed, will generate a new, anonymized digital signature for the plaintext, hashed, or encrypted data. The verification party can generate different digital signatures to indicate to third parties different levels of confidence that the associated text was typed by a human (based on the checks performed and passed).

Verification party level digital signature: A digital signature generated by a verification party (using a verification party private key and data submitted by a user). This digital signature is only associated with the public key of the verification party and therefore removes any information identifying the specific hardware from which the text originated.

II. Overview

The techniques introduced here validate that text (herein defined as any typed data) has been physically typed and is therefore likely to have been generated by a human and not by a generative AI. This validation process produces an anonymized digital signature to attest to the fact that the text was human generated. The digital signature can be attached to the text as metadata and verified by third parties. The digital signature can also contain data related to the timespan and history over which the text was typed, the app or context in which the text was typed, and in certain applications identifying information about who typed the text.

The digital signature verification can be easily checked by third-party websites. Websites can then use this verification that the text was likely human generated to prioritize, curate, or gatekeep (e.g., to exclude AI generated text). The techniques introduced here can be used to detect cheating on an essay assignment (e.g., determine whether the essay was likely human generated or not). It can serve as an automated CAPTCHA without the hassle typically associated with traditional CAPTCHAs (e.g., wherein picture puzzles must be solved). The techniques introduced here can work in a fully anonymized fashion. It can also be linked to a fingerprint scanner or other biometrics (e.g., keystroke dynamics analysis) in select applications where verified identity is required. Further, the technique can be used to filter out spam email (that was not physically typed with the recipient's email address already in place). Many other use cases are also possible, as discussed further below.

One advantage of the techniques introduced here is that they validate the presence of a human in a seamless fashion as the human is going about their normal tasks. The techniques do not require the annoying and time-consuming tasks that most CAPTCHAs do (for example identifying all the images that contain fire hydrants). The techniques introduced here have advantages over traditional CAPTCHAs to the extent that they do not interrupt the humans' flow when typing (they can run in the background of the humans' work seamlessly without being noted or noticed) and do not depend upon the cultural knowledge of the human (for example what a fire hydrant looks like in a particular nation).

Refer now to FIG. 1, which illustrates a high-level example of a system that implements the techniques introduced here. The technique can be embodied in a keystroke differentiation system (KDS) 100 that can differentiate between human generated text and AI generated text. In at least some embodiments, the KDS 100 includes a keystroke detection module 102, a keystroke verification module 103, and at least one data store 104. The keystroke detection module 102 detects keystroke inputs from each of the physical keys 105 of a physical keyboard. At least a portion of at least some the elements of the KDS 100 may be implemented within the keyboard (FIG. 1 does not depict this, for the sake of clarity). For example, at least a portion of the keystroke detection module 102 can be implemented within the keyboard. The keystroke detection module 102 includes one or more sensors to detect the occurrence of physical keystroke on any key of the keyboard. The sensors may be supplemental to, and functionally independent of, the normal hardware (e.g., electrical contacts) used to actuate a key. The keystroke detection module 102 also includes circuitry (not shown) to receive outputs of the sensors and, in response, to generate at least a digital signature for each keystroke. In some embodiments, the keystroke detection module 102 also generates and/or accesses additional information ("associated data") and associates that additional information with the digital signatures and keystroke data.

The keystroke verification module 103 will typically reside in a host computing device of which the keyboard is a part or to which the keyword is directly coupled. The keystroke verification module 103 is responsible for, firstly, verifying that the digitally signed keystrokes are valid (e.g., using a cryptographic key associated with the keystroke detection module 102 or a component thereof), coalescing the keystroke data into groups or "bundles" of text and then hashing and digitally signing a bundle of detected keystrokes and associated data, and then sending the digitally signed, hashed result to a remote verification party (third-party verification entity) via a network, such as the Internet. Data and metadata used in and/or produced by this process are stored in the one or more data stores 104. The bundles of keystroke data are hashed to preserve the privacy of the user who is doing the typing. In some embodiments, the bundles of keystroke data may also be encrypted. Note, however, that if privacy is not a concern in a given deployment scenario, both hashing and encryption may be omitted.

III. Potential Vulnerabilities of Software-Only AI Generated Content Detectors First, note why the techniques introduced here are perhaps best implemented with physical hardware and highlight where software-only attempts to differentiate human generated data from AI generated data potentially fail: Initially, it is reiterated here that software-only approaches that only attempt to analyze the text itself (for example looking at the way it is written, any grammatical mistakes, the tone or diction of the text, the burstiness or complexity of the text) in order to determine whether the text was written by a human or AI are engaged in an arms race (or cat and mouse game). AI text detecting software designed today will be usurped by AI text generating advancements of tomorrow, and so on, until the AI text generator has become indistinguishable from the normal human. At that point, all such software that attempts to detect AI generated prose or text will be usurped and have no usefulness. Given the rapid advancement that the field of AI generated content is currently experiencing, this point may be reached in the next few years.

Second, note that software-only attempts to watermark or otherwise indicate that a text is AI generated from the point of genesis have numerous drawbacks. Initially, these attempts often either include watermarks that can be removed from the text or alternatively involve cumbersome text databases that also pose a threat to privacy and control over the data being generated. More significantly, these attempts require that all text generating programs agree to implement this system. Any rogue text generating programs created around the world (e.g., on the Internet) that refuse to abide by this system, allow for the AI generation of text without indicators (e.g., watermarks) to identify this fact. Therefore, even a single rogue program significantly undermines the security of software-only attempts to watermark or otherwise indicate that a text is AI generated from its genesis.

Third, note the drawbacks of a software-only approach that attempts to apply keystroke dynamics analysis or keystroke biometrics analysis to information regarding logged keystrokes during the typing of the text. For example, AI software might look at data generated during the typing of the text including the rate, speed, pressure, etc. at which the keys were pressed. Using this information, it might attempt to show whether or not this data conforms to the way a human would type a text, and therefore that a text was human generated. A key vulnerability of that approach is an attacker's ability to use AI to generate fictitious keystroke dynamics data that accompany an AI generated text. This fictitious data could be inserted by software within the computer, or by the generation of the electronic signals that would go from a keyboard to a computer.

IV. Example Implementations

At least one embodiment of the techniques introduced here includes the following features, as further described below:

A. A Human-Computer Text/Typed Data Input Interface

B. A Hardware Security Module (HSM) Embedded Within a Keyboard that is Utilized in Generating a Cryptographic, Digital Signature C. A Method for Priming the Generation of a Cryptographic, Digital Signature (at the User/Hardware Level)

D. A Method for Verifying and Anonymizing a Cryptographic, Digital Signature (for General Public Verification Purposes)

E. A Method of Disseminating the Cryptographic, Digital Signature along with its Associated Data (for General Public Verification and Usage)

Figure 2:
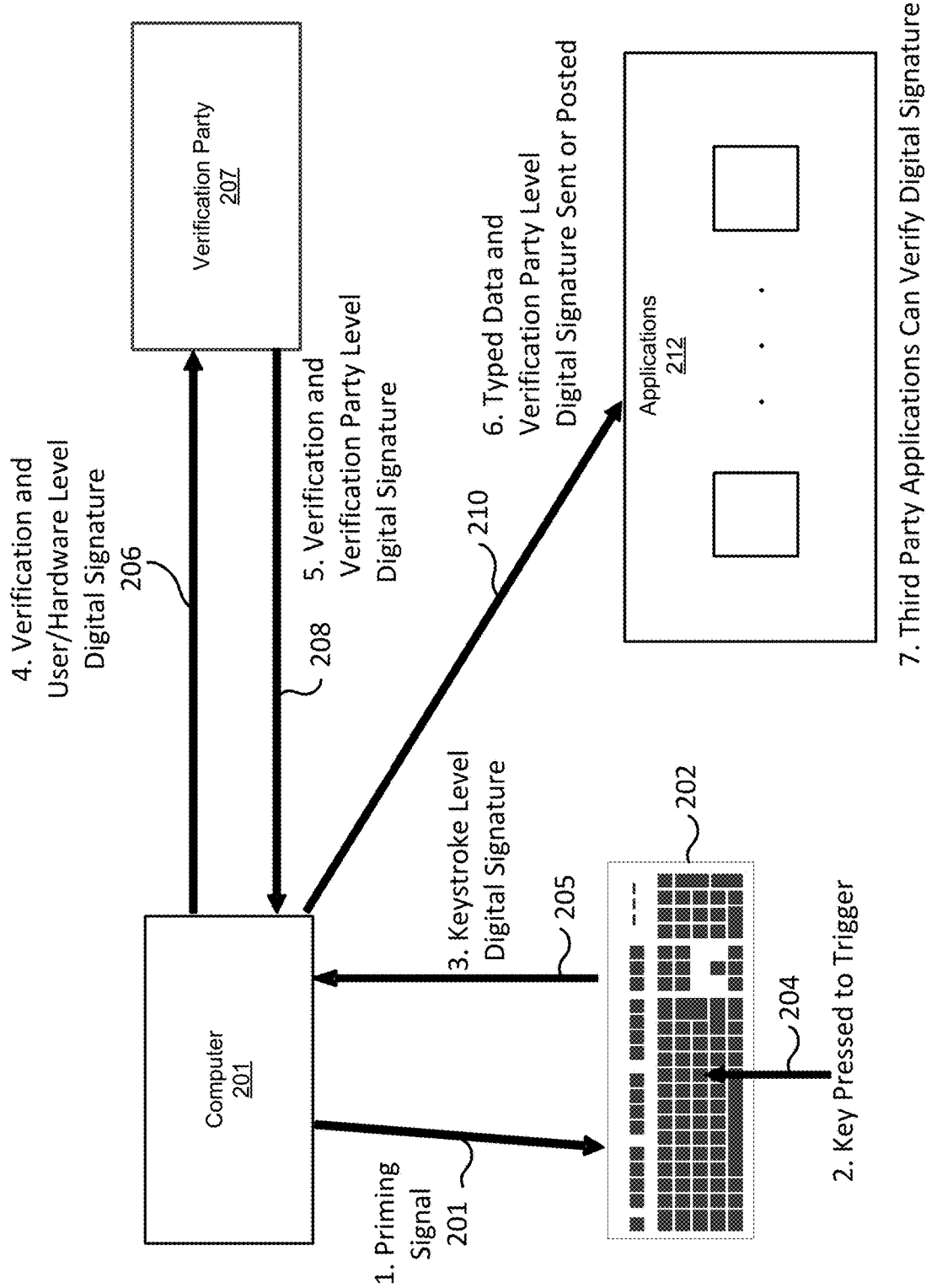
FIG. 2 is a schematic diagram showing an example of the operation of a KDS.

F. A Method of Verifying the Physical Act of Typing within the Hardware Security Module These features are discussed further below, with reference to FIG. 2, which illustrates an example of the operation of a KDS, such as KDS 100.

A. Human-Computer Text/Typed Data Input Interface

At least one embodiment of the techniques introduced here includes a human-computer text/typed data input interface, which is an interface by which a human can input text information into a computer system 201 by the act of typing (here defined as the act of touching the system using one's fingers such that the location of the touch triggers a specific action or the recording of specific information within the computer system). Examples of such an interface include a keyboard, such as a standalone keyboard or keyboard built into a laptop or other computer system, smartphone, or tablet. This description focuses on the techniques introduced here as applied to a keyboard 202 (FIG. 2) as an example.

B. Hardware Security Module Embedded within the Keyboard that is Utilized in Generating a Cryptographic, Digital Signature In at least one embodiment of the techniques introduced here, the keyboard 202 includes an HSM (not shown in FIG. 2). In the context of this description, an HSM is a module that contains a chip that can perform computational functions related to cryptography (cryptographic module), contains a private key, and has anti-tamper measures to prevent prohibited functionality (including the extraction or manipulation of the private key, the generation of a digital signature without proper priming, the generation of a digital signature without proper triggering, or the generation of an otherwise fraudulent digital signature). Some example mechanisms for priming the HSM are discussed below. After the HSM has been primed, the HSM can be triggered by the physical act of typing. Methods for verifying that the physical act of typing has occurred at the correct key are discussed below.

If the correct priming and triggering signals 203 are received by the HSM, then the HSM will generate and possibly transmit a keystroke level digital signature 205 of the typed information in response to a physical keystroke 204. Note that the transfer of information into and out of the HSM can be encrypted. This typed information can include, for example:

- the key that has just been pressed
- the time at which the key was pressed, based on the trusted clock
- sensor information about how the key was pressed (e.g., how fast or how hard it was pressed)
- prior data from recent typing (which can include text, time, and sensor information)
- the identity of the person typing
- the application or context for which the key is being typed
- random or pseudorandom data from an internal or external source The above-mentioned bullet items of information are referred to herein, individually and collectively, as the "associated data." Note that internal audits can be automatically conducted within the HSM to ensure its proper functioning.

C. Method for Priming the Generation of a Cryptographic, Digital Signature

At least one embodiment of the techniques introduced here includes a method for priming the HSM in the keyboard. "Priming" is the act of sending associated data to the HSM and preparing the HSM to receive a triggering signal. Upon triggering, the HSM will use the key press data, the associated data sent into the HSM, and the private key (held within the HSM) to generate a keystroke level digital signature 205. The associated data should be incorporated into the digital signature process so that a replay attack (wherein the same digital signature is used multiple times) will not work.

Priming can be set to occur in response to different possible inputs and/or under different possible conditions, such as:

- on a regular schedule dictated by a trusted clock
- on a semi-regular schedule dictated by a trusted clock
- on a random, semi-random, and pseudorandom schedule
- in response to program indicators such as autocorrect software (for example if autocorrect software predicts that the next letter to be typed will be "e", then the software could prime the HSM associated with the "e" key on the keyboard)
- in response to typing or sensor data
- in response to signals sent external to the local computer
- in response to a key press being initiated.

D. Method for Verifying and Anonymizing a Cryptographic, Digital Signature (for General Public Verification Purposes)

To increase the usefulness of the techniques introduced here, a user, Alice, should be able to utilize the method of the techniques introduced here to anonymously send data or post data online, while still cryptographically demonstrating that the data was physically typed (likely by a human). To enable that, in at least one embodiment of the techniques introduced here, initially keystroke level digital signatures 205 are generated by an HSM(s) embedded in the keyboard. These digital signatures are then verified, using known public keys, by a computer program running on the computer 201. This computer program is also called the "local verifier" herein. (Note that each computer/keyboard system should have a different set of private keys. Therefore, if the private keys were somehow extracted from a single device, this device can be blacklisted, and the integrity of other devices would not be compromised.) The public keys associated with the HSM(s) embedded in the keyboard, can for example be published in connection with the serial number that uniquely identifies the keyboard.

After the computer program (local verifier) verifies the keystroke level digital signatures, coalesces the data, and performs any other checks deemed necessary (e.g., keystroke dynamics analysis), the computer program will hash the typed data (and any associated data) and then generate one or more user/hardware level digital signatures 206 for the hashed data. For example one digital signature might only sign a hash of the text, another digital signature might sign a hash of the text plus the time at which the text was typed, a third digital signature might sign a hash of the text plus the context for which the text was written, and a fourth digital signature might sign a hash of the text plus the time at which the text was signed plus the context for which the text was written. By keeping the various digital signatures separate, Alice can ultimately decide the level of detail she would like to provide for the ultimate "product." Alternatively, the text and some or all associated information can be added together before the hashing procedure, but the associated information can be encrypted with different keys (only to be revealed later). In this circumstance, two hashes would be provided: one with just the typed data, and a second with the typed data and all associated data encrypted with different keys.

The hashed data along with the corresponding user/hardware level digital signature is then sent (either immediately or stored and then sent) by the computer program to the (third party) verification party 207. The verification party 207 will check that the hash for the typed data only is not on a forbidden hash list and will verify the user/hardware level digital signatures. This is possible because the verification party knows or can find out the public key(s) for the user/hardware level digital signature(s). For convenience, the computer program can send the public key associated with the digital signature to the verification party. The verification party can use this public key to verify the validity of the digital signature and can also check that the public key is authorized. The verification party can, for example, check if the public key is authorized by consulting a database of authorized public keys or checking if the public key has itself been digitally signed by a trusted manufacturer or trusted intermediary. If the tests are passed, then the verification party 207 will generate a new set of verification party level digital signature(s) 208 for the hashed datasets provided. These digital signature(s) are sent back to the user (Alice), and any data from the transaction is erased by the verification party 207.

If the techniques introduced here are to be implemented with the possibility of sting operations, then at least one hashed dataset of only the typed data is provided to the verification party (regardless of other hashed data sets that include the typed data plus associated data).

E. Method of Disseminating the Cryptographic, Digital Signature Along with its Associated Data (for General Public Verification and Usage)

Alice may choose to send the typed data or post the typed data online for use by one or more third-party applications 212, which may also be referred to as third-party consumer entities. If and when Alice chooses to do so, she can include metadata to demonstrate to third parties that the data has been physically typed and is therefore likely generated by a human. This metadata includes at least the digital signature for the hash of the typed data only. Alice can also choose to include other digital signatures corresponding to a hash of the typed data plus associated data. She can then choose to also reveal the associated data in a non-hashed format. If that data was encrypted, she can choose to provide the decryption key(s).

A third-party application 212 can verify Alice's data 210 as likely to be generated by a human as follows. First the third party will verify the digital signatures (using published public keys known for the verification party 207). Note that this does not give away any information regarding the identify of Alice, her hardware, or create associations with any other data typed and posted from this same hardware. Next, the third party can hash the typed data only to verify that the data matches the hash that is digitally signed. The same process can be applied to the typed data plus associated data. This entire process can be automated and seamless. Through this process the third-party application 212 can verify that Alice's data is physically typed and any other associated data that she has chosen to provide, all while maintaining Alice's anonymity.

F. Method of Verifying the Physical Act of Typing within the Hardware Security Module In at least some embodiments, the HSM can only be induced to generate a digital signature if the HSM is primed and then triggered under specified conditions. For example, in some embodiments there may be a programmed time limit between the priming and triggering functions. If triggering occurs outside of the specified time window, then the generation of a digital signature can be forbidden at that time (enforced within the HSM and/or computer program). Alternatively, if one or more other keys are pressed between the priming and the triggering events, the generation of a digital signature can be forbidden at that time (e.g., enforced within the HSM and/or computer program).

The triggering event is defined to require that physical typing is sensed; that is, the HSM will only generate a digital signature if triggered to do so by the act of physical typing. Methods for detecting physical typing are discussed below.

V. Example of the Overall Method

An example of the method in the techniques introduced herein is summarized briefly as follows, in accordance with a particular hardware implementation: First a user, Alice, begins to type on her keyboard in order to input data into a computer system. A computer program, running in the background on the computer system, detects this fact (typing). The program begins to collect data about what is being typed along with any associated data. More specifically, as the typing occurs, HSM(s) mounted below each key in the keyboard become primed by one or more methods previously discussed. Priming entails sending associated data into each HSM's cryptographic module to prepare each HSM's cryptographic module to detect a triggering event. The triggering event can only be induced by a physical movement associated with the pressing down on the key (which is above the primed HSM). When a triggering event is detected for an appropriately primed HSM, this event causes the HSM to create a digital signature of the key press data (i.e., the corresponding letter or numeral) and any associated data, using the private key embedded in the HSM. This digital signature is then sent to the computer program.

The program collects these digitally signed snippets of data (key press data and any associated data). Periodically, or in response to some predefined condition(s), the program will coalesce the snippets of data. The process of coalescing the snippets of data involves verifying the keystroke level digital signatures generated by the HSM(s). In at least some embodiments, this is made possible since the public keys associated with these specific HSMs are known to the program. (The program can be informed of these public keys by a pairing process conducted by the user upon setting up the keyboard/computer system or can be done at the factory during assembly.) After verifying the keystroke level digital signatures, the program can apply other checks to the text and associated data to verify that the text is likely human generated. (Note that this program must be secure against manipulations to its source code.) These checks could involve keystroke dynamics analysis, looking at the timing, sensor data, context, and continuity of the text (looking for overlap of redundant snippets) and could involve machine learning or other advanced algorithms. Parts of this program can be implemented within secure modules within the computer hardware. (Note that the digital signatures ensure that the associated data cannot be faked in a software-only attack.) Once the program has verified that the data was likely physically typed by a human, the program can produce a user/hardware level digital signature for the entire data package (all of the coalesced snippets, or a bundle of text). This digital signature is generated based on a private key stored in the program or a HSM accessible to the program. This private key can be distinct from the private keys used to sign the keystroke level digital signatures and is associated with hardware of this specific system.

A user/hardware level digital signature for an entire page of text (for example) could be generated when Alice presses "save" or "send" on the document. Furthermore, the digital signature can include relevant associated information such as a timestamp of when the text was generated and/or the context in which the text was generated. For privacy, all the data is first hashed, prior to the generation of any user/hardware level digital signature(s). The user/hardware level digital signature(s) along with the hashed data can then be sent to a verification party. If the computer system has an Internet connection at the time of generation, these digital signatures and hash values can be automatically and immediately sent to the verification party. Alternatively, if the computer system does not presently have Internet connectivity, the digital signatures and hashed data can be automatically stored locally until Internet connectivity is established, at which time the digital signature(s) and hashed data can be automatically sent to the verification party.

Upon receipt of the digital signature(s) and hashed data, the verification party will first verify the digital signature(s) (given that the verification party has access to the public key(s) associated with the user/hardware level digital signature(s)). Next the verification party will check the hash values against forbidden hashes. If both verification steps are passed, then the verification party will generate new digital signature(s) (using its own private key(s)) for the hashed data. The verification party will then send the new verification party level digital signature(s) back to the computer system that submitted the hashed data. The verification party will also purge its system of any data from the prior interaction. (Note that the verification party never knows and cannot find out which data (unhashed) originated from which computer system.)

After the (automatic) interaction with the verification party, Alice now has her typed text data stored locally on her computer system, along with a verification party level digital signature(s) that can be used to validate that the text was physically typed and other pertinent information (such as when the data was typed and in what context). Alice can now post her text data to the Internet along with the digital signature(s). Additionally, and for example, if Alice wants third parties to be able to verify when that text was human generated, she could post the text and timestamp along with the relevant digital signature. Likewise, if Alice wants third parties to be able to verify the context for which the text was generated (e.g., as an email to one specific email address), she can post that information as well (along with the relevant digital signature). Note that this information along with the digital signature can be included as metadata to her text. A third party can then simply take a hash of the data that Alice has posted and use the known public key of the verification party to verify that the digital signature(s) correspond with the hashed data. Note that the posting/sending and third-party verifying steps can be done automatically (without requiring additional approvals from Alice).

In the description that follows, different possible implementations of the techniques introduced here are presented along with a discussion of the level of security provided, difficulty/expense to fabricate/implement, ease of use, and possible attacks.

VI. HSM Based Embodiments

Various HSM based embodiments will now be further described.

A. Single Chip

In at least one embodiment of the techniques introduced here, a single HSM (chip) is embedded within the keyboard used by a human to type data into a computer system. In such an embodiment, all of the signals generated by the pressing of various keys on the keyboard can be routed to the single HSM, where they are digitally signed. This embodiment reduces costs, given that only a single HSM is used. However, a single-HSM embodiment also tends to be less secure against physical attacks. An attacker could potentially feed fictitious electronic signals into the inputs of the HSM, thus spoofing the act of typing. Furthermore, preventing this form of attack would be difficult, since the paths over which different electronic signals for different keystrokes would have to be carried are spread out on a typical keyboard. For improved security against such attacks, the entire keyboard could be fitted with anti-tamper measures. This implementation nonetheless might work well for smartphone, tablets, or other digital keyboards on touchscreens. Many smartphones already have secure modules built in, so implementation of the techniques introduced here would not be difficult.

B. Multiple Chips

Figure 3:
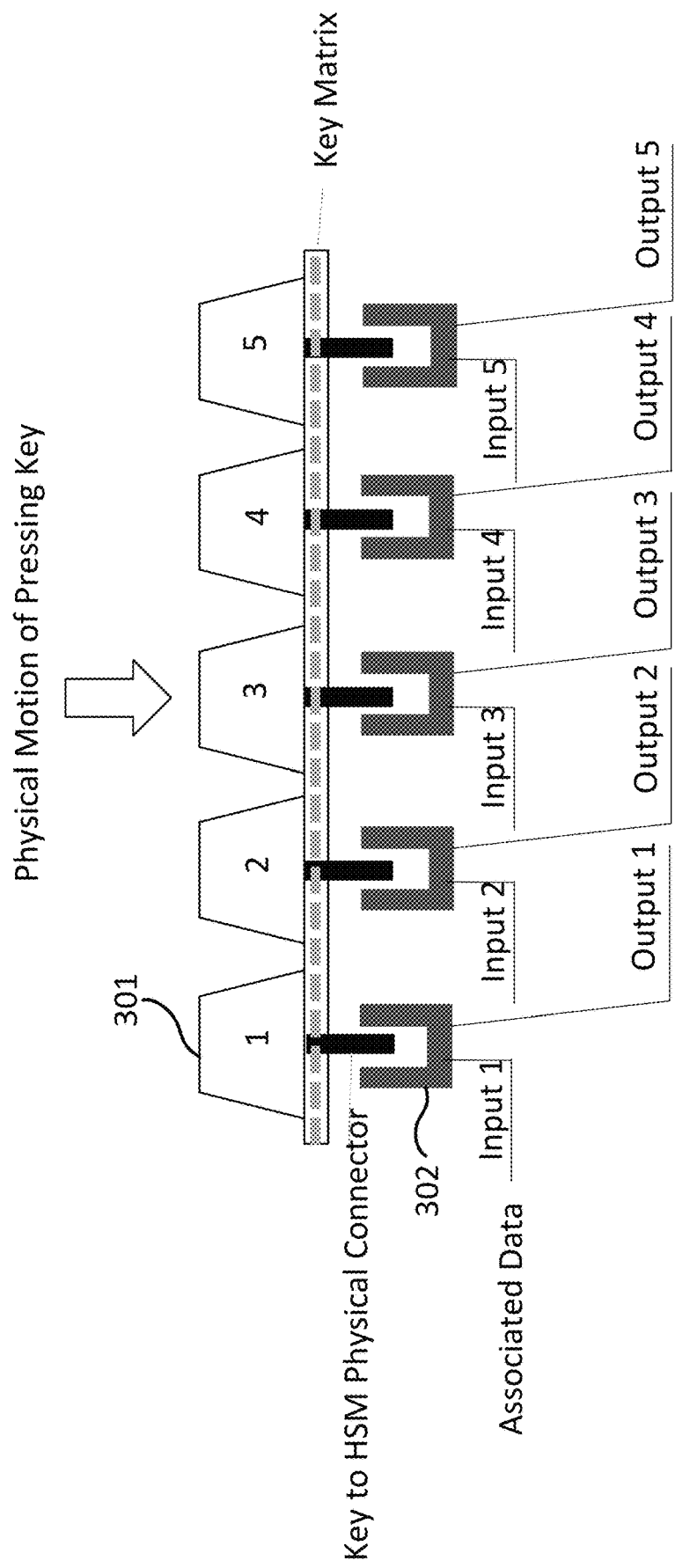
FIG. 3 shows schematically an example of how an individual HSM can be associated within a keyboard with each key of the keyboard.

In some embodiments of the techniques introduced here, multiple HSMs (chips) are used. An example of such an embodiment is illustrated schematically in FIG. 3. At the high end, a dedicated HSM 302 can be located underneath every individual key 301 on the keyboard. Alternatively, a small number of HSMs 302 could be placed under only selected (e.g., the most important) keys 301. In general, including more HSMs 302 increases the security by both providing more information for checks and increasing the difficulty of developing a robot that can effectively "type" at each of the HSM-associated keys 301.

C. Flexible or Mechanically Deformable HSM

Protection is needed for HSMs (e.g., so that they do not reveal a private key contained within them) to protect them against careful physical inspection, physical dismantling, or other physical attacks. In order to provide this protection, HSMs are typically designed with anti-tamper (tamper-proof, tamper-resistant, or tamper-evident) mechanisms built in. These mechanisms might include a fine electrical mesh or layered structure that if cut or drilled through will disrupt the electrical operation of the chip, specialized membranes, sealants, or potting materials, internally pre-stressed materials that will fracture if interfered with, and the possibility to zero-ise secret information (such as a private key) within the chip if interference is detected. If the HSM is designed in such a way that it is flexible, portions of it are flexible, or it can be mechanically deformed, then incorporating sensors to measure pressure, strain, etc. within the HSM is viable.

D. Countermeasures

To prevent, or at least make difficult, the possibility of spoofing the HSM to register physical typing and create a triggering event when no physical typing has actually occurred, countermeasures can be employed. These countermeasures (in addition to traditional anti-tamper measures) can include sensors (e.g., electric field sensors, magnetic field sensors, electromagnetic sensors) to detect interference that would be generated from expected spoofing attacks. If interference is detected, the HSM could be automatically designed to prevent the generation of digital signature(s) (e.g., while certain criteria are met, for a specified period of time, or permanently thereafter).

E. Types of Sensors

1. Capacitance Sensing

One physical sensing mechanism that can penetrate the housing of a rigid HSM is capacitance sensing. This form of sensing, often used with rigid touchscreens detects when an object with sufficient capacitance touches a surface or comes near to a surface. For example, a conductive layer could be built into keyboard keys that senses the capacitive touch of human skin. Alternatively, the act of compressing a key could alter the distance between two parallel plates leading to a measured change in capacitance. This is a relatively simple sensor mechanism to build into a keyboard. Moreover, some keyboards use capacitive sensing to determine which key has been pressed. Drawbacks to a capacitive sensing embodiment include that it only provides moderate levels of security that could potentially be defeated with moderate difficulty/expense. If the capacitive sensors are physically accessed, they can be spoofed by an electrical wire and transistors. This type of setup could mimic typing motion by using electrical signals only, which can open and close various transistor electrical pathways and apply interfering electric fields.

2. Electrical Resistance Sensing

Electrical resistance depends on the geometry of the conductor. If the conductor is deformed, changes in the shape can translate into regular, and easily measurable changes in the electrical resistance through the circuit (e.g., using a Wheatstone bridge circuit). This principle is the basis of a strain gauge, which can quantify strain (to the flexible system). This principle therefore makes possible a simple and inexpensive embodiment of the techniques introduced here, if the HSM can be made flexible, or as long as a sufficient anti-tamper mechanism can be implemented into the strain gauge. The pressing of a key could induce measurable strain in a strain gauge or related device, to be used as a triggering event.

3. Piezoresistance or Piezoelectric Sensing

Some materials experience a change in resistance, or generation of a voltage when placed under strain. If incorporated into a flexible HSM, these materials could sense physical typing by the strain induced by the motion of the keys.

4. Temperature Sensing

Temperature sensors, which sense the heat of the human body in contact with a key could be incorporated into a rigid HSM. This method of detecting physical typing is indirect and could be spoofed by generating heating or cooling effects with solid-state electronics such as resistive heater or thermoelectric cooler. Therefore, this only provides security with moderate difficulty/expense.

5. Closing a Circuit

Many keyboards sense the pressing of a key by physically closing a circuit. If the pressing of a key could induce the physical closing of a circuit within a flexible or mechanically deformable HSM or similar anti-tamper device, this signal could be used as a triggering event.

6. MEMS Sensors (Pressure, Strain, Accelerometer, Gyroscope)

Microelectromechanical systems (MEMS) can measure pressure, strain, acceleration, or angle of rotation reliably using a small package and at moderate costs. If the HSM (or other anti-tamper methods) can accommodate flexibility or mechanical deformation, a pressure or strain sensor embedded within the chip could be used to detect physical typing. Alternatively, if the HSM is rigid, the HSM could still use MEMS sensors to detect acceleration (or induced rotation) during the pressing of a keyboard key.

7. Changes to Resonance Frequency of Structure

If a structure is flexible and can be deformed by the pressing of a key, the resonance frequency of the structure will change. Testing for changes in resonance frequency of the structure can therefore be used to test for the pressing of the key. Like other sensing techniques, this technique uses flexible or deformable structures. However, in some implementations the flexible structure does not need to be housed with the HSM (only probed from within a rigid HSM).

8. Sound or Vibration Sensing

The physical act of typing produces both sound and vibration. (Although sound is technically a form of vibration, in this context the term "sound" refers to acoustic energy transmitted primarily through air, while "vibration" refers to vibrations transmitted through media other than air.) This data could be measured with microphones or accelerometers within rigid HSMs. However, spoofing of these signals may be possible, therefore only presenting security based on moderate difficulty/expense.

9. Light Reflection or Absorption

The pressing of a key could alter a path for the reflection or absorbance of light within the keyboard. This change could be detected using lights, lasers, mirrors, photoreceptors, or cameras within the keyboard. Ambient light could also be used as a light source. The light could be coherent, diffuse, or projected from multiple angles.

10. Light Depth Map

Projected light could be used to create a depth map of the keys, either inside the keyboard or outside. This could be used to determine whether a key is pressed. However, this also poses potential privacy concerns and may be difficult to implement. This technology has been used in iPhones for facial identification and the TrueDepth camera. Note that light could be projected within the keyboard or even down onto the keyboard.

11. Motion of a Small Magnet Through or Near a Coil

Figure 4:
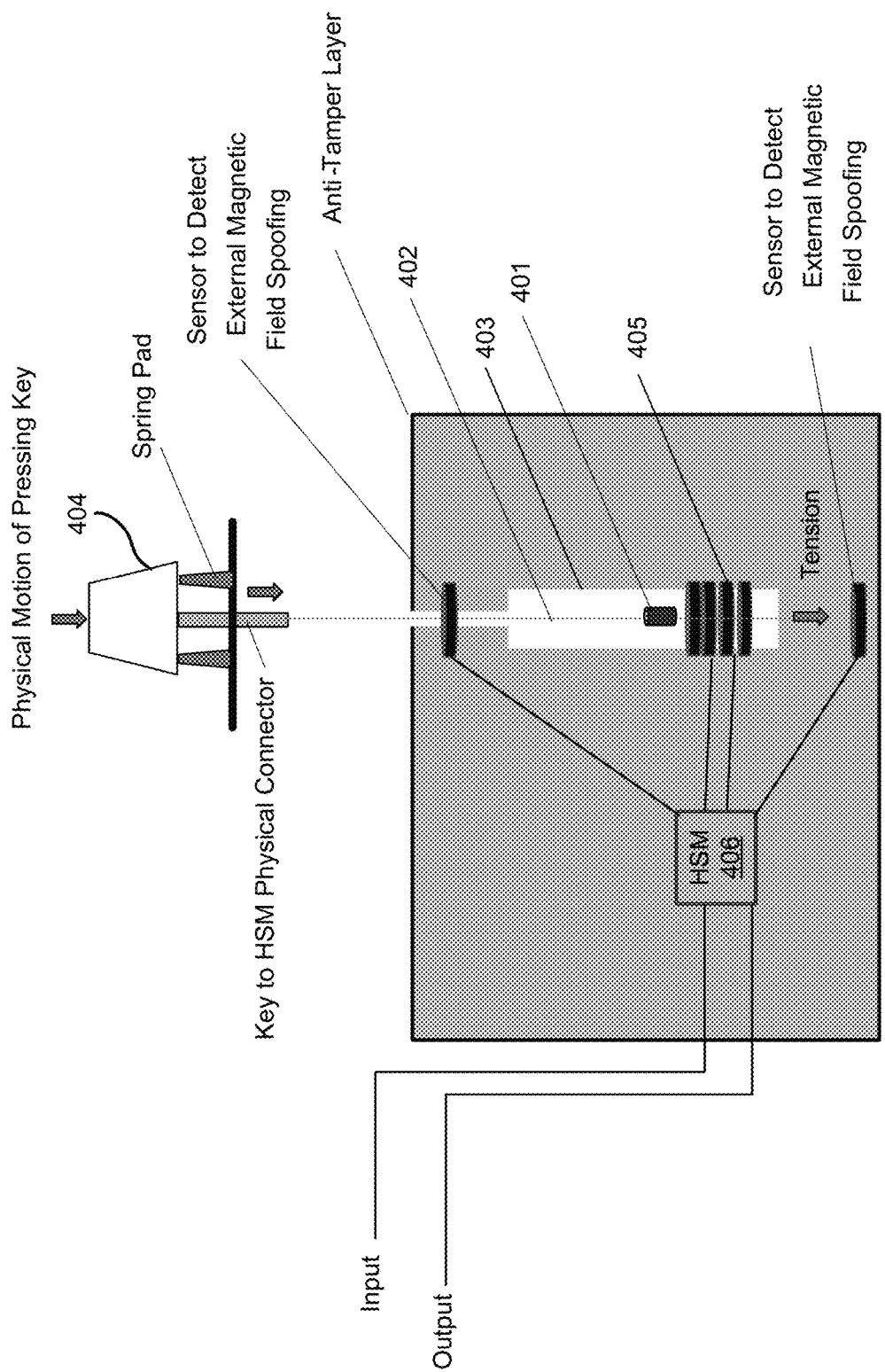
FIG. 4 shows an example of a magnet-and-coil based sensor for detecting physical keystrokes.

In some embodiments of the techniques introduced here, the HSM can detect the physical act of typing by detecting the physical displacement and motion of a small permanent magnet (wherein the motion is induced by the physical act of typing). An example of such an embodiment is illustrated in FIG. 4. The magnet 401 can be held along a thin wire or rod 402 that enters into a rigid encased tube 403 that is partially closed at each end. Alternatively, the magnet 401 can be embedded within a flexible polymer within the rigid tube 403, or even pushed and pulled by a fluid within the tube. As a key 404 is pressed, the magnet 401 is forced down the tube 403 (for example, moving by a distance comparable to the key travel, e.g., about 1-4 mm). When the key 404 is released, the magnet 401 returns to its starting position. The rigid tube 403 (which is fixed in place relative to the keyboard) contains a conductive coil 405 (which can be embedded within or behind the rigid tube). Passage of the magnet 401 vertically up or down through or near the coil 405 generates a small current and voltage within the coil 405. This small voltage can be measured and amplified to create a triggering signal within the cryptographic module (not shown) in the HSM 406. Importantly, the rigid tube and magnet system can be embedded within the HSM 406, with only small holes at the top and/or bottom wherein the motion of the key can be transferred to the magnet by a thin wire, rod, flexible polymer, or fluid. Apart from these small holes (which could be, for example, 25 microns in diameter), the rigid tube can be much thicker inside. However, the entire casing of the rigid tube is within the HSM and protected by its anti-tamper mechanisms. Additionally, anti-tamper mechanisms can be built into the rigid tube itself. Therefore, the rigid tube likely cannot be opened, drilled into, or modified without triggering anti-tamper mechanisms. Furthermore, small conductive coils and voltage sensors could be placed around or near the openings (holes at the top and bottom) in order to detect for any magnetic field interference from the outside (e.g., a spoofing attempt). When produced in the factory, the magnet 401 could be loaded into the rigid tube from the side, which is then sealed with anti-tamper mechanisms. A coil is one possible mechanism to detect the motion of the permanent magnet within the rigid tube. A Hall effect sensor is another possible mechanism to detect the motion of the permanent magnet within the rigid tube. Here the term "rigid tube" can refer to a void space within the HSM of multiple possible shapes including, but not limited to, a cylinder, ellipsoid, sphere, cube, or other complex shape. Some advantages of this embodiment are as follows:

- The sensor can be built into a rigid HSM.
- The sensor is simple, inexpensive, and has few moving parts.
- Because the rigid tube, magnet, and sensor are embedded within the HSM, they are afforded strong anti-tamper protections.
- It would be very difficult to spoof the signal (i.e., to produce a changing magnetic field at the sensor that tricks the sensor into registering the permanent magnet has moved relative to the rigid tube, when it has not).

The difficulty of spoofing with this embodiment comes from a combination of factors. First, the technology for generating magnetic fields is not as compact as the technology for generating electrical signals or electric fields. Without physically moving a small magnetic, a changing electric field is needed to generate a magnetic field. In order to generate a magnetic field within the rigid tube that has the correct orientation to produce the triggering voltage, a solenoid would be inserted into rigid tube. However, since the openings on either end of the rigid tube are, for example, only 25 microns in diameter, they are too small to insert a solenoid microcoil directly. The smallest microcoil on record is 27 microns in diameter and most microcoils are much larger. A simple design can be used to prevent the screwing of a microcoil into the upper or lower openings. Furthermore, it would be extremely difficult (made more difficult by simple design additions) to coil a small solenoid within the rigid cylinder while only accessing the space through the small upper and/or lower openings.

Attempts to spoof the system by applying an external magnetic field would be detected by the coil detectors near the upper and lower openings. The magnetic field detector within the rigid tube cannot be accessed with direct electrical contacts since the magnetic field detector is either embedded in or behind the rigid tube. This security can be amplified with anti-tamper measures included in the surface of the rigid tube. A magnet-and-coil embodiment, therefore, is considered advantageous because such an embodiment is simple, inexpensive, has few moving parts, provides high security that would be very difficult to overcome or spoof, and does not change user experience of typing significantly (does not change the feel of pressing each key on the keyboard).

Figure 5:
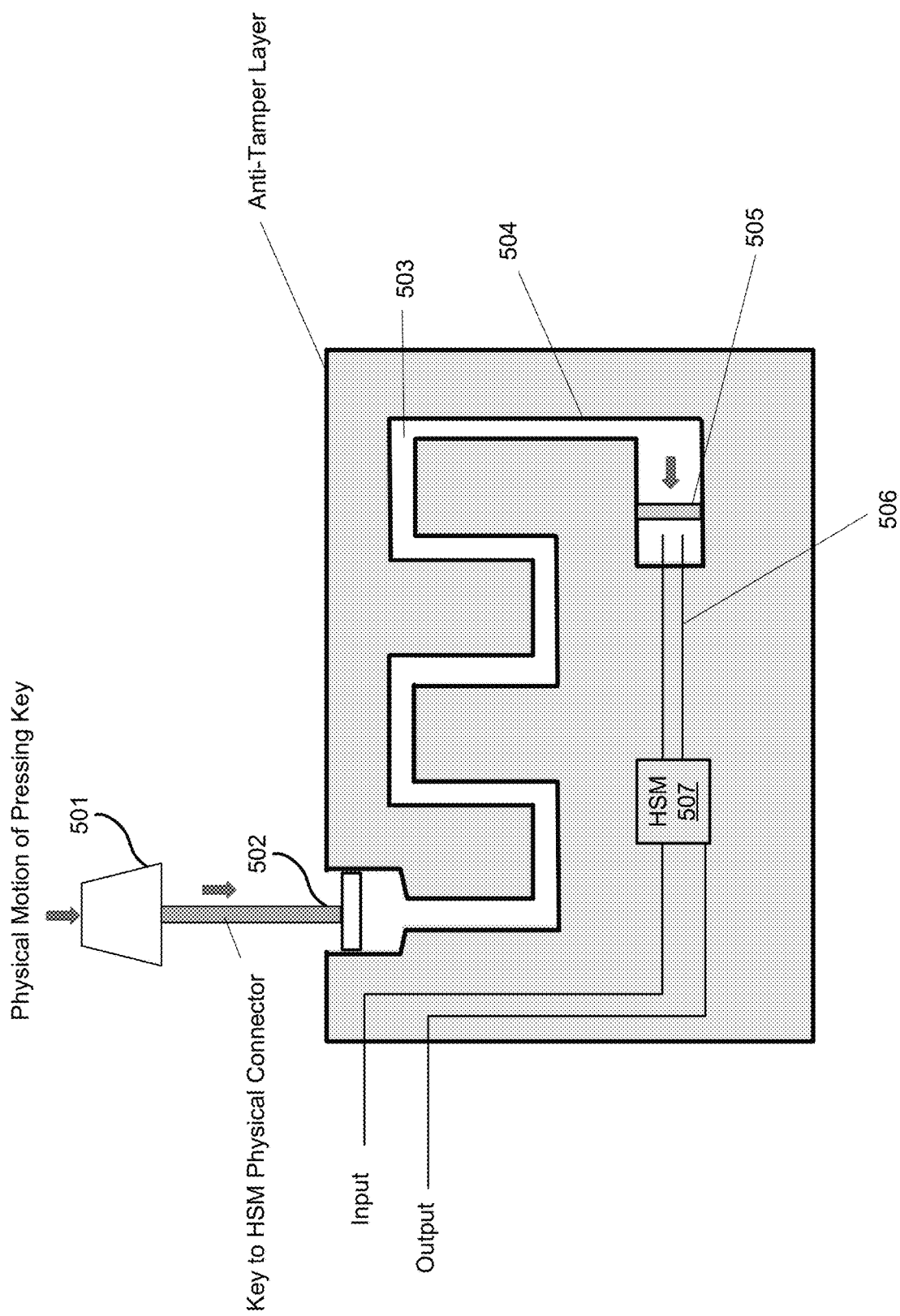
FIG. 5 shows an example of a piston-and-fluid based sensor for detecting physical keystrokes.

12. Sensors Located in Hard-to-Reach Locations, Locations to which Access is Limited by Anti-Tamper Measures Reasonable security could be provided by placing the sensors in difficult to reach locations. For example, if a sensor is placed at the bottom of a nearly sealed tube that only has a small, complicated, open pathway entrance shape, it would be difficult for an adversary to access that sensor and spoof the signal using non-moving parts. Note that the encasing around the sensor should contain anti-tamper measures to make access even harder for the adversary. In this embodiment, the sensor is protected against spoofing even though the sensor is not entirely encased within the HSM. It has at least one small port by which the key can physically (indirectly) press the sensor. The sensor could be indirectly pressed using a rod, a wire, a fluid, a gel, or a more elaborate mechanical system. FIG. 5 shows an example of a sensor arrangement in which the pressing of a key 501 on the keyboard moves a first piston 502, which thereby applies pressure to a force transfer fluid 503 contained within an enclosed channel 504, thereby causing a second piston 505 located farther along the channel 504 to make physical and electrical contact with a set of conductive wires or traces 506, to complete a circuit of the cryptographic module (not shown) in the HSM 507.

13. Proximity Sensor

A proximity sensor can detect the distance between two objects. This can be done with capacitive sensing, inductive sensing, or by measuring the reflectance of light or sound waves (e.g., ultrasonic or infrared sensors). Such a sensor could in theory detect the distance between the key and keyboard (and therefore determine whether the key is being pressed). However, it is expected that these systems are generally overly complicated and expensive for use in the techniques introduced here. Some of the techniques introduced here also do not have sufficient resolution to measure the changes small distances necessary in the techniques introduced here.

14. Digital Cryptographic Handshake Between Two or More Chips

Two chips could be induced to interact, either through direct contact, near field communication (NFC), or other techniques. These chips could digitally and cryptographically interact with one another to verify their presence near one another (or the absence thereof). In one embodiment, two chips (each with their own anti-tamper measures) would be needed to communicate with one another in order to produce the full keystroke level digital signature. This approach could add a layer of security.

Note that multiple techniques or sensors for detecting the act of physical typing (such as any of those mentioned above and/or below) can be integrated into a single keyboard system to increase the security of the system. In some cases, the sensors are embedded within a keyboard, attached externally to a keyboard, or placed in the vicinity of a keyboard.

VII. Embodiments Based on Legacy Computing Devices

Some embodiments of the techniques introduced here can be implemented without requiring any changes to existing (legacy) computing devices. For example, some embodiments can use the existing microphone(s) and/or accelerometer(s) on a laptop computer, smartphone, or both, to certify that text has been physically typed. The physical act of typing produces both sound and vibration. Consequently, these sensory outputs can be measured with microphones and/or accelerometers and used to validate that the physical act of typing occurred to produce specific typed text. However, it may be possible to spoof these signals using speakers or other haptic devices.

One way to increase the difficulty for an adversary to spoof these sensory outputs (for example with speakers or other haptic devices) would be to use multiple microphones and/or accelerometers that are spatially separated from one another. The combined measured signals can provide spatial mapping information regarding where the sound and/or vibration originated and therefore information about the location of the key being pressed at a specific time. Given known information about the layout of the keys on the keyboard (for example that the keyboard is in QWERTY configuration), the approximate location of the keypress can be correlated to the letter key pressed. This information can in turn be used to validate that the text data recorded digitally on the computer matches with the physical pressing of keys (i.e., physical typing).

Figure 6:
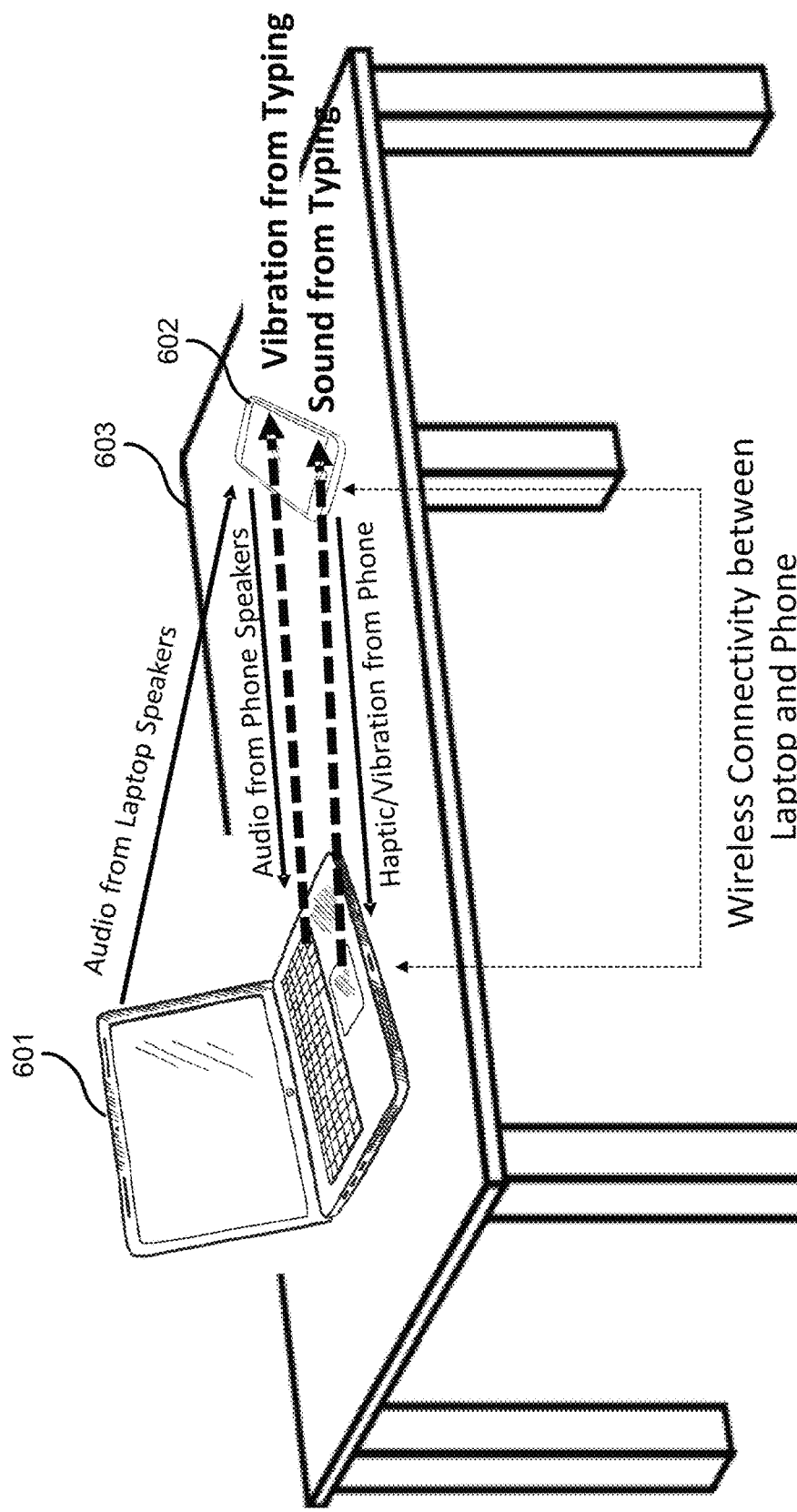
FIG. 6 illustrates an example of a physical arrangement of components that use sound and vibration to verify human typing.

FIG. 6 illustrates an example of a physical arrangement of components for an embodiment that uses sound and vibration to verify human typing. Implementation of such an embodiment could proceed according to the following steps.

1. First, a user sets up a spatially separated array of microphones and/or accelerometers. This array should have at least two elements, but could contain many elements. The microphones and accelerometers could be placed together or separately. There are multiple ways in which the array could be configured spatially and physically implemented. For example, the microphones and/or accelerometers could comprise the microphones and/or accelerometers inside of a laptop computer 601 (hereinafter simply "laptop") and inside of a smartphone 602, wherein the laptop 601 and smartphone 601 are sitting on a hard surface 603 such as a tabletop in the vicinity of one another. Alternatively, the microphones and/or accelerometers could be built into or embedded within a laptop or keyboard.

Figure 7:
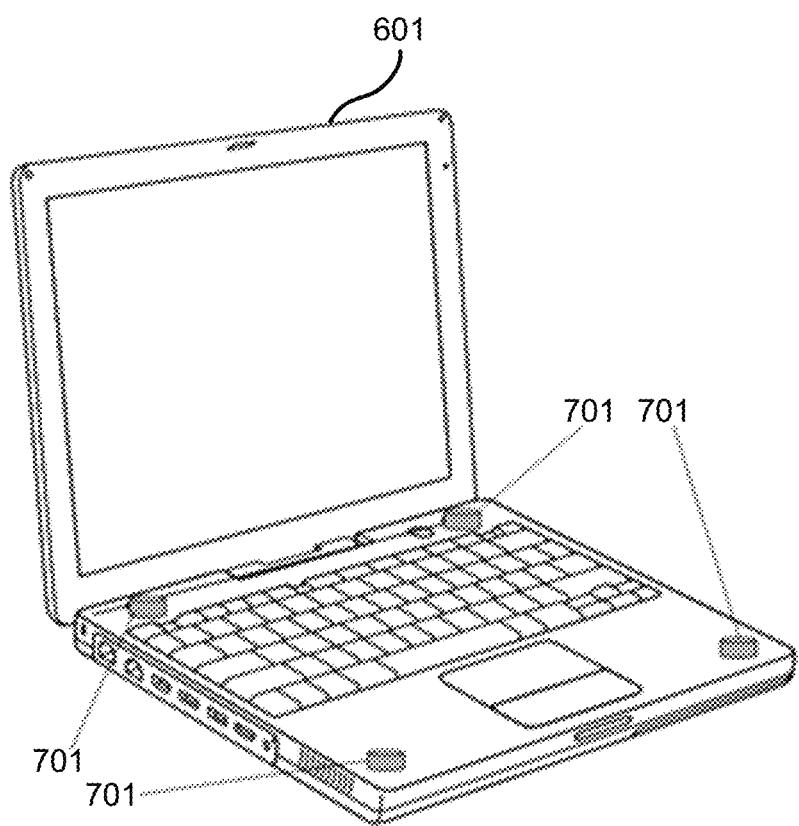
FIG. 7 shows an example of how pods containing microphones, accelerometers, etc. can be distributed on a laptop computer.

As another alternative, the microphones and/or accelerometers could be affixed to a laptop, keyboard, or surface in contact or in the vicinity of a laptop or keyboard. For example, a microphone and an accelerometer can be packaged into a small container, referred to herein as a "pod." A pod can be roughly the diameter of a US dime, as illustrated in FIG. 7. A pod 701 can house a microphone, an accelerometer, electronics that could transmit the data wirelessly to the associated computer (e.g., by Bluetooth), and a small battery. A pod 701 can also contain electronics to implement cryptography to securely pass information collected from the sensors (e.g., microphone and accelerometer) to the computer (e.g., using public key cryptography, digital signatures, HSM). A pod 701 can further contain the electronics necessary for wireless recharging (and could be recharged if sitting on or near a recharging pad, or if the laptop or keyboard were placed on a recharging pad). A pod 701 can also contain an internal trusted clock and/or a small speaker or vibration/haptic response device. If the pod 701 contains a small speaker or vibration/haptic response device, then these output transducers could be used to communicate signals to other pods. A pod 701 can also have the capability to generate pseudorandom outputs from their speakers or vibration/haptic response devices. This pseudorandom output capability could be designed to deter an adversary from attempting a spoofing attack.

Multiple pods 701 can be affixed to a laptop or keyboard as shown by example in FIG. 7, using an adhesive substance on the back of the pod, for example. Pods 701 can also potentially be affixed to the laptop or keyboard using magnets, snaps, or fastening devices. For example, a base for each pod 701 can be permanently affixed to the laptop or keyboard using adhesives. Then the pod 701 can attach to and detach from this base using magnets, locking in place mechanisms, sliding in to lock in place mechanisms, or other snaps, velcro, or fastening devices. Note that small microphones and accelerometers can be manufactured for less than 1 dollar each. Therefore, the overall manufacturing costs per pod can be kept low. Note that pods 701 can be sold as an add-on feature to upgrade an existing laptop or keyboard. Further, pods 701 could be attached to the top, bottom, or sides of a laptop or keyboard. Moreover, pods 701 could also be affixed to an object that is in contact with or in the vicinity of the laptop or keyboard. For example, the pods 701 can be affixed to the table, desk, or holder on which the laptop or keyboard is sitting.

2. Next, a computer program (e.g., in the computer being used to do the typing or a separate device, such as a smartphone) records sound and/or vibration data using the microphone(s)/accelerometer(s) while the physical act of typing is taking place. This recorded data is referred to herein as "sensory data". The sensory data can next be transmitted in a secure fashion to the computer program, such that the data cannot be fabricated, corrupted, or altered during the recording or during the transmission. For example, the microphone(s)/accelerometer(s) could be housed in a HSM that can digitally sign or otherwise encrypt the sensory data so that it could not have originated from spoofed electronic signals and so that it could not be altered, edited, or replaced (without detection) during the transmission from the sensors to the computer program. Note that while the sensory data is being recorded, it can also be used to capture signals from the laptop speakers, computer speakers, or smartphone speakers. Note that while the sensory data is being recorded, it can also be used to capture signals from any vibration/haptic device that is available to transmit data as vibrations. The speaker(s) and/or vibration/haptic device(s) can be used to transmit "associated data" to be recorded by the sensors alongside the sound and/or vibrations from the physical act of typing. The associated data that is simultaneously recorded by the sensors can serve as a priming signal to help prevent replay-type spoofing attacks. Note that the computer program should be able to verify the time that the sensory data was produced, for example by using a trusted clock or trusted timestamping. The associated data can also help to establish the time that the sensory data was produced.

3. Next, the computer program will use the recorded sensory data to create a spatial mapping. This can be done by triangulation, for example, which can be accomplished by using sensory data regarding sound and/or vibration signal intensity or by using sound and/or vibration signal timing. The intensity of sound decreases with distance from the source of the sound in predictable ways. Likewise, for a medium with known properties, the intensity of vibrations decreases with distance from the source of the vibration in predictable ways. If multiple sensors record the same sound generated by a physical pressing of a key, they will each record a different intensity of sound on the basis of their distinct distances from the source of the sound (where the keystroke occurred). With multiple microphones placed at known spatial locations relative to the keyboard, one can mathematically solve for the approximate location of where the key press occurred on the keyboard (i.e., triangulation). Furthermore, once the locations where each of a plurality of key presses has occurred are determined by triangulation, this data can be used to uniquely determine the location and orientation of the keyboard relative to the sensors. This is an example of a spatial mapping. Additionally, if the size and character key layout of the keyboard are known, then a series of equations can be solved to determine the location and orientation of the keyboard relative to each of the sensors, even if the spatial locations of the sensors are initially unknown. For example, each triangulated key press is associated with a specific character key located at a specific, known distance and orientation relative to all the other character keys on the keyboard. Taken together, sensory data collected by multiple sensors recording a plurality of key presses along with collected digital data indicating the specific character typed in association with each key press can be used to uniquely identify the location of each sensor with respect to the keyboard, even if the sensor locations are initially unknown.

Likewise, the same process can be applied to vibrations generated from the physical pressing of a key and transmitted (for example) through a solid medium (e.g., a table or laptop) before being registered by multiple accelerometers. Once again, this data can be triangulated to locate the source of the vibration. In some embodiments (for example when the accelerometers are in both a laptop and a smartphone, each sitting on a table in close vicinity to one another) the properties of the medium through which the vibrations are transmitted may be initially unknown. For example, a wood table may have different vibration transmission characteristics than a metal table or a plastic table. However, if the smartphone can generate and transmit vibrations/haptic responses of known characteristics (e.g., known intensities), these vibrations/haptic responses can be used to transmit associated data. These vibrations/haptic responses of known characteristics will be recorded by the accelerometers in the laptop and in the smart phone. Using this data, properties regarding the solid medium (e.g., a table) and its ability to transmit vibrations can be deduced. These deduced properties can then be used for triangulation and to solve for the spatial mapping.

Furthermore, the different timespans it takes for sensory signals generated by the same event source (e.g., a unique instance of a key press) to travel to and reach each distinct sensor can also be used for triangulation. Sound travels at a specific, predictable, known speed in air (especially when parameters such as temperature, pressure, and humidity are known). Given this known speed and the known locations of the microphones, the origin point of a sound can be approximately triangulated by comparing the time for that sound to travel from its origin to each microphone. A similar process can be employed to triangulate for the origin of a vibration transmitted through a solid medium (e.g., a table or laptop) to an accelerometer.

In some embodiments (for example when the accelerometers are in both a laptop and smartphone sitting on a table in close proximity to one another) the properties of the medium through which the vibrations are transmitted (e.g., speed of sound in the medium) may be initially unknown. However, if the smartphone can generate and transmit vibrations/haptic responses of known characteristics (e.g., known intensity, known timing), these can be used to transmit associated data. These vibrations/haptic responses of known characteristics will be recorded by the accelerometers in the laptop and in the smartphone. Using this data, properties regarding the solid medium (e.g., a table) and its ability/speed to transmit vibrations can be deduced. These deduced properties can then be used for triangulation and to solve for the spatial mapping.

In some embodiments, the location and orientation of the microphones and/or accelerometers with respect to the keyboard might be initially unknown. For example, in an embodiment where the microphones and accelerometers are located in both a laptop and a smartphone sitting near one another on a table, the exact orientation and distance of the smartphone from the laptop may be initially unknown. However, using known locations of the laptop speakers relative to the laptop microphone and the known locations of the smartphone speaker relative to the smartphone microphone, the distance and orientation of the smartphone with respect to the laptop can be deduced. For example, the associated data played over the speakers of the laptop will be picked up by both the microphone of the laptop and the microphone of the smartphone, allowing for triangulation. Likewise, the associated data played over the speakers of the smartphone will be picked up by both the microphone of the laptop and the microphone of the smartphone. Note that the sounds played over the speakers are of known intensity and timing. This data allows for triangulation and determination of the distance and orientation of the smartphone relative to the laptop. Likewise, known vibrations/haptic responses can be produced by the smartphone that are picked up by the accelerometer in the smartphone and the accelerometer in the laptop. This data can also be used for triangulation.

In some embodiments, a short calibration period may be required before use. During this calibration period, known outputs (from speakers and vibration/haptic response) can be used to triangulate the positions of the speakers and accelerometers relative to the location and orientation of the keyboard. This calibration can also potentially deduce data about sound and/or vibration transmission properties of the air or solid media. In some cases, this calibration step will only need to be performed once or infrequently. Note that in some embodiments, the calibration may need to occur with a simultaneous video recording of the typing, or other sensor data as an additional validation step.

Note that data from multiple microphones and accelerometers along with different but complementary triangulation methods (based on signal intensity vs based on signal timing) can all be combined to improve the spatial mapping and prevent spoofing.

4. The computer program will then compare the triangulated approximate locations of instances of key presses with the recorded digital text generated at the same time as each key press. For example, if the letter "a" is pressed on the keyboard, multiple events will occur simultaneously. Pressing the key on the keyboard will cause the key matrix in the keyboard to send an electronic signal to the computer to record that the "a" key was pressed. The computer program running in the background will keep track of the time at which this event occurred. Additionally, if the "a" key was physically pressed, this action will create sound and vibrations. The sound and vibrations will be measured with microphones and accelerometers and recorded as sensory data. This data (including the time at which it occurred) is recorded and transmitted to the computer program over a secure channel, such that the signal cannot be replaced or manipulated while it is being transmitted. (The secure channel is based on cryptography and can, for instance, take the form of a private key held within a HSM in conjunction with the sensor and a means to create a digital signature for the transmitted data. The computer program can verify the digital signature for the data, and determine whether it is valid, given the corresponding public key.) The computer program will use the sensory data to create a spatial mapping and determine approximately where on the keyboard the physical key press event occurred. It will compare this approximate location to the known locations of various keys on the keyboard. For example, on a QWERTY keyboard, the "a" key is at the far left, middle row. In contrast the "1" key is at the far right, middle row. The computer program will vet whether the key press event came from approximately the correct location that coincides with the location of the "a" key on a QWERTY keyboard.

5. The computer program will compare the sounds and vibrations generated by each distinct key press (as measured by the microphones and accelerometers) to a prerecorded set of sounds and vibrations generated by the user physically typing on the keyboard. When each distinct key on the keyboard is pressed, it creates a slightly different sound. These different sounds can be used for acoustic sniffing to determine which key has been pressed by eavesdropping alone. A similar process can be done using vibrations. This process may incorporate an initial calibration phase, wherein the user types a given prompt, while being simultaneously filmed performing the physical typing. Note that the footage might only record the hands and keyboard. During this calibration phase, the expected sounds and vibrations for a specific user pressing specific keys on a specific keyboard are established. Thereafter these prerecorded sounds and vibrations can be used for comparison to sounds and vibrations generated by the user while typing with the camera off for privacy reasons.

6. The computer program will validate the keystrokes by performing some or all of the various vetting steps described (e.g., vetting the keystroke input data against the spatial location of the key press, vetting the keystroke input data against the sounds and vibrations generated by the user pressing the keys, validating the digital signature or other cryptography). Keystroke dynamics analysis can also be incorporated into the vetting process for some applications or embodiments. If the computer program determines that the signals pass the vetting procedures (indicating that the text was physically typed by a human), then it will allow for the creation of a user/hardware level digital signature, which can be passed to the verification party.

In some embodiments, the sound and/or vibration sensors can be embedded within the keyboard. The sensors could be placed at a few known and spread-out locations within the keyboard that are hard to access or alter. These sensors could be within HSMs and have their own cryptographic modules to generate digital signatures. Such an embodiment would not require the initial deployment-phase spatial mapping of sensor data described above. For example, an embodiment might have three such sensors or pods embedded at known locations within a keyboard during keyboard fabrication. These may not be each associated with a specific key of the keyboard, but would nonetheless be able to distinguish (individually or by their collective processing capabilities) keystrokes from different keys of the keyboard.

Note that the measures described herein make it difficult, though not impossible, for an adversary to spoof the aforementioned signals and pass off text as physically typed when it has not been physically typed. This type of attack would likely require significant effort and the use of multiple devices that can spoof sounds and vibrations including the ability to spoof the location of the source of a sound or vibration.

VIII. Process Flows

FIGS. 8 through 12 illustrate examples of process flows associated with the techniques introduced here. Refer first to FIG. 8, which illustrates an example of an overall process that may be performed by an HSM in a keyboard (which may be one of multiple identical or similar HSMs in the keyboard), to facilitate keystroke verification in accordance with the techniques introduced here. Note that multiple iterations of the process 800 may be performed in connection with a user typing any particular text, sequentially and/or in parallel. Initially, at step 801 the process 800 detects a physical motion associated with a pressing of a particular physical key on a physical keyboard, wherein the particular physical key is associated with a particular character (e.g., a letter or numeral). The process 800 then generates at step 802 a first cryptographic digital signature associated with the particular character in response to detecting the physical motion associated with the pressing of the particular physical key. At step 803 the process 800 then provides a typed character and the first cryptographic digital signature to a first verification entity located within the first processing device, for verification of a physical keystroke.

Figure 9:
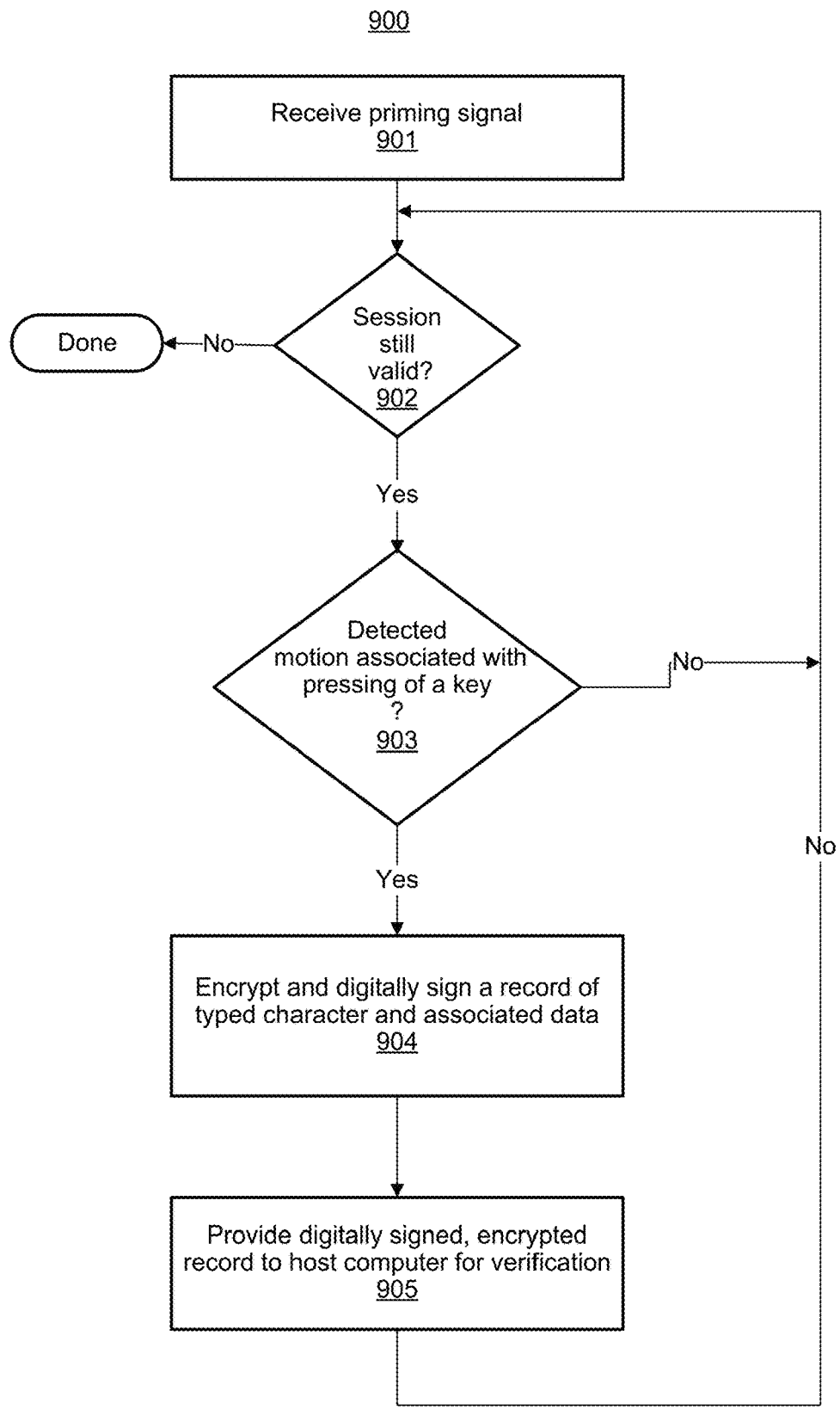
FIG. 9 is a flow diagram illustrating in more detail another example of a process that can be performed by an HSM in a keyboard.

FIG. 9 illustrates in more detail another example of a process that can be performed by an HSM in a keyboard. Initially, at step 901 the HSM receives a priming signal from the host computer, in connection with a particular typing session. The HSM then determines at step 902 if the session is still valid (e.g., if a specified time window since the priming signal was received has not expired). If the session is not still valid, the process 900 ends. If the session is found to be valid, then the HSM determines at step 903 if any motion associated with the pressing of a key has been detected. This determination may be based on the outputs of sensors associated with each of the keys in the keyboard, as described above. If no motion has been detected, the process 900 loops back to step 902. If motion has been detected, then at step 904 HSM encrypts and digitally signs a record of the typed character and associated data (where the associated data may have been received from the host computer as part of or in conjunction with the priming signal). Next, at step 905 the HSM provides the digitally signed, encrypted record to a local verification entity in the host computer for verification, as described in connection with FIG. 10.

FIG. 10 an example of an overall process 1000 that may be performed by the local verification entity in the host computer to which the keyboard referred to in the previous paragraph is connected, or of which the keyboard is an integral part. Process 1000 can execute as a counterpart process to process 800 (FIG. 8) or process 900 (FIG. 9), discussed above. The verification entity may be implemented in the form of software or firmware that executes on one or more programmable hardware processors. Initially, at step 1001 the process 1000 obtains (e.g., from one or more HSMs within the keyboard) a plurality of first cryptographic digital signatures associated with a set of typed characters. Each of the plurality of first cryptographic digital signatures is associated with a separate character in the set of typed characters, and each character has been generated in response to detection of a physical motion associated with a pressing of a physical key on the physical keyboard. Next, at step 1002 the process 1000 verifies each of the first cryptographic digital signatures. If all of the signatures are successfully verified (step 1003), the process 1000 proceeds to generate a hash of the typed characters at step 1004, and then generates a digital signature of the hash at step 1005. The process 1000 then sends the hash and the digital signature to the remote verification entity (e.g., via the Internet) at step 1006. If one or more of the key level digital signatures were not successfully verified, the process 1000 outputs an error message at step 1007 to the user and/or a higher layer of software.

Figure 11:
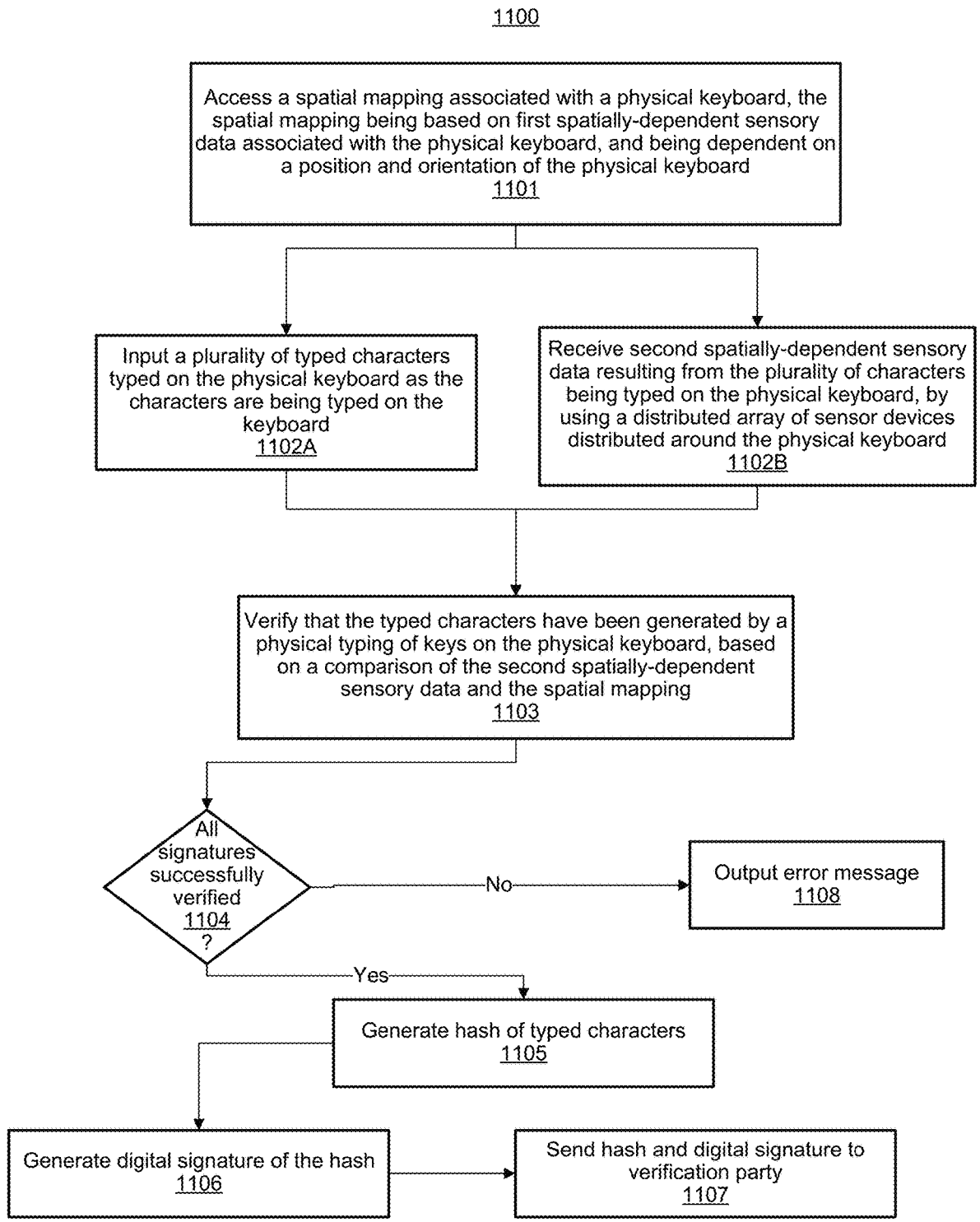
FIG. 11 is a flow diagram illustrating an example of an overall process associated with an embodiment that uses sound and/or vibration to identify and verify keystrokes.

FIG. 11 illustrates an example of a process associated with one or more of the embodiments represented by FIGS. 6 and 7, i.e., an embodiment that uses sound and/or vibration to identify and verify keystrokes. The process may be performed by, for example, software within a computer that is being used to type the text. Initially, at step 1101 the process 1100 accesses a spatial mapping associated with a physical keyboard. The spatial mapping is based on first spatially-dependent sensory data associated with the physical keyboard and is dependent on a position and orientation of the physical keyboard. Next, the process performed steps 1102A and 1102B in parallel. In step 1102A the process 1100 inputs a plurality of typed characters typed on the physical keyboard as the characters are being typed on the keyboard. Concurrently, at step 1102B the process 1100 receives second spatially-dependent sensory data resulting from the plurality of characters being typed on the physical keyboard, by using a distributed array of sensor devices distributed around the physical keyboard. At step 1103 the process 1100 verifies that the typed characters have been generated by a physical typing of keys on the physical keyboard, based on a comparison of the second spatially-dependent sensory data and the spatial mapping, in the manner described above. Next, at step 1103 the process 1100 verifies that the typed characters have been generated by a physical typing of keys on the physical keyboard, based on a comparison of the second spatially-dependent sensory data and the spatial mapping. If all of the characters are successfully verified (step 1104), the process 1100 proceeds to generate a hash of the typed characters at step 1105, and then generates a digital signature of the hash at step 1106. The process 1100 then sends the hash and the digital signature to the remote verification entity (e.g., via the Internet) at step 1107. If one or more of the characters were not successfully verified, the process 1100 outputs an error message at step 1108 to the user and/or a higher layer of software.

Figure 12:
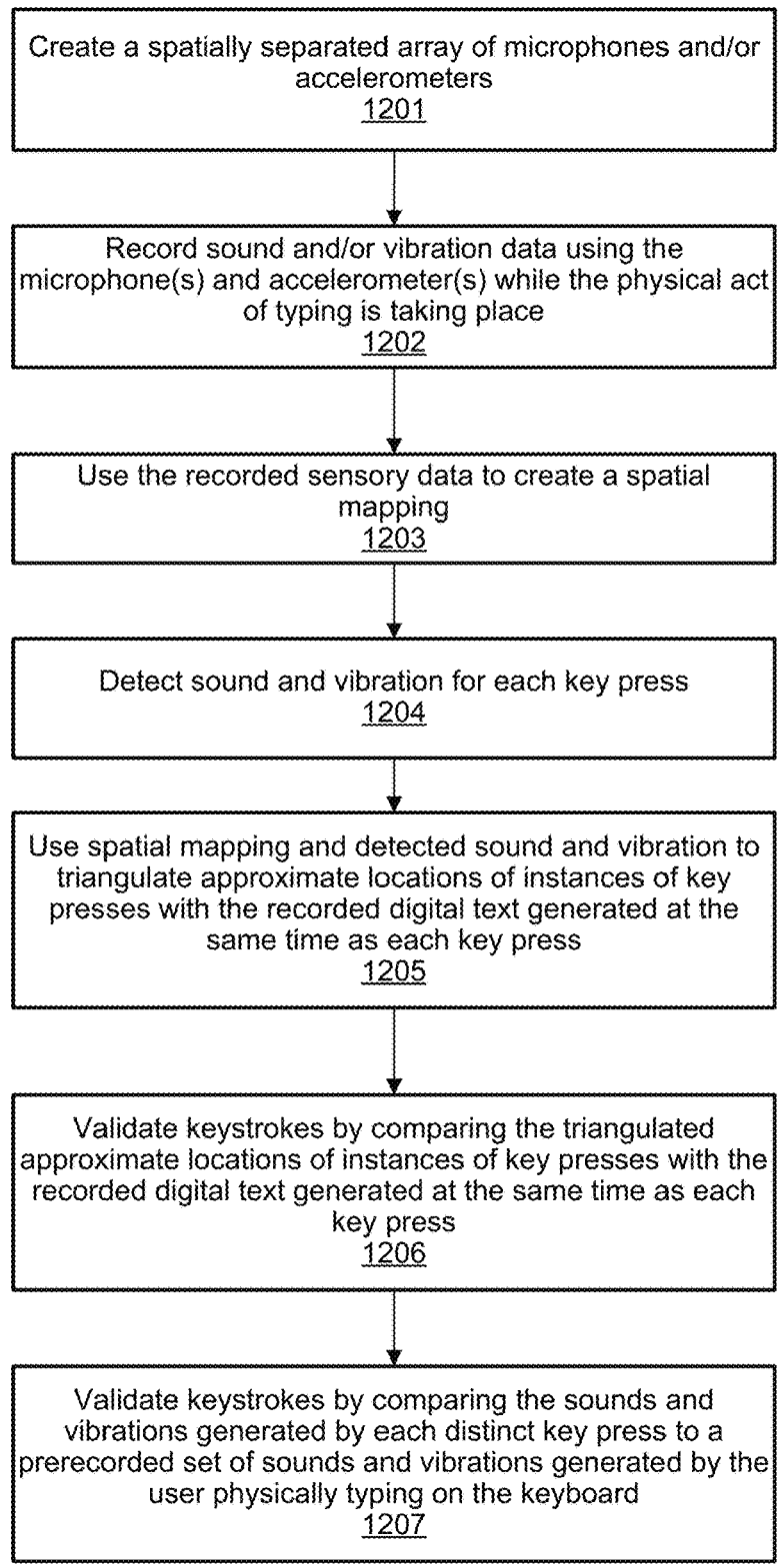
FIG. 12 is a flow diagram illustrating another example of an overall process associated with an embodiment that uses sound and/or vibration to identify and verify keystrokes.

FIG. 12 illustrates another example of a process associated with an embodiment that uses sound and/or vibration to identify and verify keystrokes. Initially, at step 1201 a user creates a spatially separated array of microphones and/or accelerometers. This may be done using a physical configuration like that in FIG. 6 or FIG. 7, for example. Next, at step 1202 the computer on which the typing is being done, or a separate nearby computer, records sound and/or vibration data using the microphone(s) and accelerometer(s) while the physical act of typing is taking place. At step 1203 the computer uses the recorded sensory data to create a spatial mapping. The computer then detects sound and vibration for each key press at step 1204. At step 1205, the computer uses the spatial mapping and the detected sound and vibration to triangulate the approximate locations of instances of key presses with the recorded digital text generated at the same time as each key press. The computer then validates the individual keystrokes at step 1206, by comparing the triangulated approximate locations of instances of key presses with the recorded digital text generated at the same time as each key press. The computer then further validates the individual keystrokes by comparing the sounds and vibrations generated by each distinct key press to a prerecorded set of sounds and vibrations generated by the user physically typing on the keyboard at step 1207.

Figure 13:
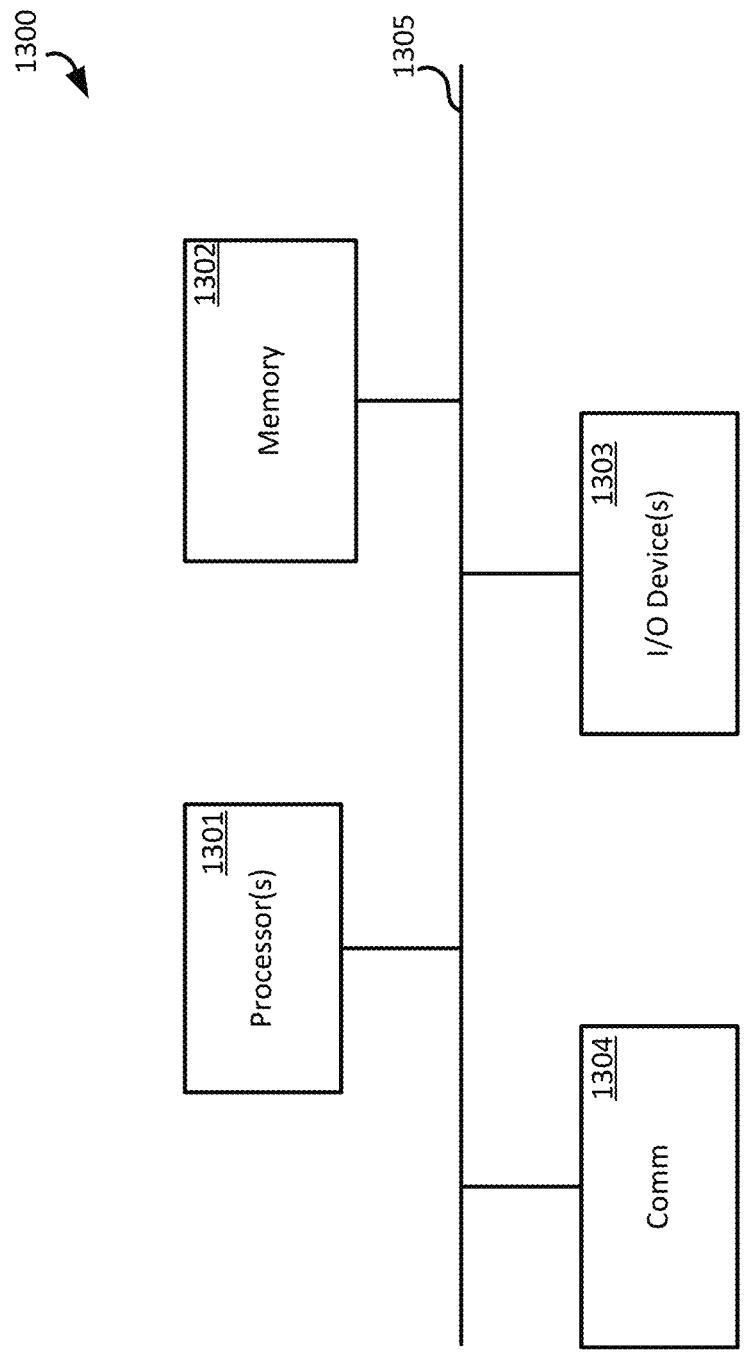
FIG. 13 is a block diagram illustrating an example of a computer system in which at least some aspects of the techniques introduced here can be implemented.

FIG. 13 is a block diagram illustrating an example of a computer system 1100 in which at least some aspects of the techniques introduced here can be implemented, including, for example, the keystroke verification module 103 (FIG. 1) and/or local verification entity. The computer system 1300 includes one or more processors 1301, one or more memories 1302, one or more input/output (I/O) devices 1303, and one or more communication interfaces 1304, all connected to each other through an interconnect 1305. The processor(s) 1301 control the overall operation of the computer system 1300, including controlling its constituent components. The processor(s) 1301 may be or include one or more conventional microprocessors, programmable logic devices (PLDs), field programmable gate arrays (FPGAs), application-specific integrated circuits (ASICs), etc. The one or more memories 1302 store data and executable instructions (e.g., software and/or firmware), which may include software and/or firmware for performing the techniques introduced above. The one or more memories 1302 may be or include any of various forms of random access memory (RAM), read-only memory (ROM), volatile memory, non-volatile memory, or any combination thereof. For example, the one or more memories 1302 may be or include dynamic RAM (DRAM), static RAM (SDRAM), flash memory, one or more disk-based hard drives, etc. The I/O devices 1303 provide access to the computer system 1300 by human user, and may be or include, for example, a display monitor, audio speaker, keyboard, touch screen, mouse, microphone, trackball, etc. The communications interface 1304 enables the computer system 1300 to communicate with one or more external devices (e.g., one or more servers and/or clients of the computer system 1300) via a network connection and/or direct connection. The communications interface 1304 may be or include, for example, a Wi-Fi adapter, Bluetooth adapter, Ethernet adapter, Universal Serial Bus (USB) adapter, or the like. The interconnect 1305 may be or include, for example, one or more buses, bridges or adapters, such as a system bus, peripheral component interconnect (PCI) bus, PCI extended (PCI-X) bus, USB, or the like.

VIII. Summary of Selected Examples

The techniques introduced herein, according to at least some embodiments, can be summarized as set forth in the following numbered examples:

Example 1. A method of verifying and validating that data stored on a computer system originated with the physical typing of that data, comprising the steps of: providing at least one HSM that can detect physical typing, utilizing the HSM to generate a cryptographic, digital signature associated with the data that was typed, and allowing for third parties to verify the digital signature associated with the data that was typed.

Example 2. The method of example 1 wherein at least one HSM is embedded inside of a keyboard.

Example 3. The method of example 1 wherein one or more HSMs can detect the motion of specific key(s) on the keyboard and pressing specific key(s) on the keyboard enables the generation of digital signature(s) associated with each specific key press.

Example 4. The method of example 3 wherein the HSM can detect physical typing by capacitive sensing.

Example 5. The method of example 3 wherein the HSM can detect physical typing by magnetic sensing (e.g., magnetic inductive sensing or magnetic Hall effect sensing).

Example 6. The method of example 3 wherein the HSM can detect physical typing by electrical resistance sensing.

Example 7. The method of example 3 wherein the HSM can detect physical typing by piezoresistance or piezoelectric sensing.

Example 8. The method of example 3 wherein the HSM can detect physical typing by sensing changes in temperature due to contact with body heat.

Example 9. The method of example 3 wherein the HSM can detect physical typing by the physical closing of a circuit.

Example 10. The method of example 3 wherein the HSM can detect physical typing by utilizing a pressure sensor or strain sensor.

Example 11. The method of example 3 wherein the HSM can detect physical typing by utilizing an accelerometer or gyroscope.

Example 12. The method of example 3 wherein the HSM can detect physical typing by changes to the resonance frequency of a structure under tension or compression.

Example 13. The method of example 3 wherein the HSM can detect physical typing by sensing the sound or vibration generated when pressing a key during the act of typing.

Example 14. The method of example 3 wherein the HSM can detect physical typing by measuring differences in light reflected, refracted, or absorbed that are induced by the pressing of a key during the act of typing.

Example 15. The method of example 3 wherein the HSM can detect physical typing by utilizing light to create a depth map of the displacement of a key during the act of typing.

Example 16. The method of example 3 wherein the HSM can detect physical typing by sensing a change in voltage or current generated by a moving magnet, wherein the magnet is induced to move by the motion of pressing a key during the act of typing.

Example 17. The method of example 16 wherein the motion of pressing a key causes the magnet to move by indirect mechanical contact between the key and the magnet where the indirect contact includes the use of one or more rods or wires.

Example 18. The method of example 16 wherein the motion of pressing a key causes the magnet to move by indirect contact between the key and the magnet where the indirect contact includes the use a spring, flexible element, flexible polymer, or filler.

Example 19. The method of example 16 wherein the motion of pressing a key causes the magnet to move by indirect contact between the key and the magnet where the indirect contact includes the use of an encased fluid.

Example 20. The method of example 3 wherein the HSM contains or is connected to a sensor that can detect typing wherein said sensor can be triggered indirectly by mechanical or fluid motion though a port by the pressing of a key, but the sensor is partially encased within a location that is hard to access through the port, wherein the encasement contains anti-tamper measures.

Example 21. The method of example 3 wherein the HSM that can detect physical typing by utilizing a proximity sensor to determine the distance between a specific key or a component attached to a specific key and a fixed reference point.

Example 22. The method of example 3 wherein the HSM can detect physical typing by registering a cryptographic digital handshake made by contact or proximity between two or more cryptographic chips, with at least one chip located on or attached to a specific keyboard key and at least one chip held at a fixed location independent of the motion of the specific keyboard key.

Example 23. The method of example 3 wherein the HSM can detect physical typing by sensing bioelectricity from contact with a person's fingers.

Example 24. The method of example 3 wherein the HSM that can detect physical typing has at least one flexible or mechanically deformable component.

Example 25. The method of example 3 wherein the HSM that can detect physical typing uses flexible electronics that can be deformed by the pressing of a key during the act of typing.

Example 26. The method of example 3 wherein the HSM contains countermeasure sensors that will detect the unauthorized introduction of electric, magnetic, or electromagnetic signals designed to spoof the proper functioning of the HSM.

Example 27. The method of example 1 wherein the HSM is embedded inside of a smartphone or tablet device.

Example 28. The method of example 1 that makes use of a trusted clock.

Example 29. The method of example 1 that incorporates data from previously typed text into the data that is to be cryptographically, digitally signed.

Example 30. The method of example 1 that incorporates data from a trusted clock into the data that is to be cryptographically, digitally signed.

Example 31. The method of example 1 that incorporates timestamped keylogger data (which keys were pushed at which times) into the data that is to be cryptographically, digitally signed.

Example 32. The method of example 1 that incorporates data from physical sensors associated with specific keys into the data that is to be cryptographically, digitally signed.

Example 33. The method of example 1 that incorporates data from the application or context for which the text is being typed.

Example 34. The method of example 1 wherein the generation of a digital signature utilizing the HSM is initiated by a priming signal.

Example 35. The method of example 34 wherein the priming signal is generated by a computer program.

Example 36. The method of example 34 that is based on an autocomplete computer program function.

Example 37. The method of example 34 wherein the priming signal is generated by a random or pseudorandom mechanism.

Example 38. The method of example 34 wherein the priming signal is generated by the detection of typing.

Example 39. The method of example 1 wherein the data that is to be cryptographically, digitally signed is cryptographically hashed at least once prior to the generation of at least one cryptographic digital signature associated with the hashed data.

Example 40. The method of example 1 wherein the typed data is first cryptographically, digitally signed at the user/hardware level. The user/hardware level digital signature and data is then communicated to an external party (e.g., a certification authority) that can perform a check on the data, verify the user/hardware level digital signature as derived from authorized, legitimate hardware, and assign a second cryptographic digital signature to the data. This digital signature can be verified by third parties without revealing information about the original user/hardware source of the typed data.

Example 41. The method of example 1 that makes use of a fingerprint scanner to authenticate the identity of the human typing the data.

Example 42. The method of example 1 that makes use of facial recognition to authenticate the identity of the human typing the data.

Example 43. The method of example 1 that makes use of keystroke biometrics analysis to authenticate the identity of the human typing the data.

Example 44. The method of example 1 wherein at least one digital signature is uploaded to a blockchain.

Example 45. The method of example 1 wherein a hybrid combination of symmetric and asymmetric cryptography is utilized.

Example 46. The method of example 1, wherein keystroke dynamics analysis is utilized in generating an automated assessment as to whether or not the typing is characteristic of a human. This assessment can be used to determine whether or not to generate a hardware/user level digital signature.

Example 47. The method of example 1, wherein a private key is held within the HSM.

Example 48. The method of example 1, wherein only selected portions of the text are validated as physically typed Example 49. A method of verifying and validating that data stored on a computer system originated with the physical typing of that data, comprising the steps of:

encrypting data locally as it is typed on a keyboard, transmitting that encrypted data to a computer program, decrypting that data within the computer program, generating a digital signature within the computer program that is associated with the data, submitting a cryptographically hashed version of the data along with the digital signature to an external verification party, receiving an anonymized digital signature pertaining to the hashed data in return from the verification party that is associated with the verification party private/public key, and allowing for third parties to verify the returned digital signature from the verification party as evidence that the data originated with physical typing.

Example 50. A method of example 49 that utilizes an encrypted keyboard.

Example 51. A method of example 49 that utilizes a smartphone or tablet.

Example 52. A method of verifying and validating that data stored on a computer system originated with the physical typing of that data, comprising the steps of;

making use of one or more sensors to detect the physical act of typing, the generation of a cryptographic, digital signature associated with the data that was typed, and allowing for third parties to verify the digital signature associated with the data that was typed.

Example 53. The method of example 52 wherein the sensors can detect the sounds and/or vibrations produced during the act of typing on a keyboard.

Example 54. The method of example 53 wherein the sound or vibration data from the sensors is used to determine which specific key on the keyboard is being pressed or to determine a subset of specific keys that contain the specific key on the keyboard that is being pressed.

Example 55. The method of example 54 wherein a computer program analyzes the sensor input.

Example 56 The method of example 55, which further makes use of Fourier Transform, Machine learning, or artificial intelligence.

Example 57. The method of example 52 wherein at least one of the physical sensors is a microphone Example 58. The method of example 52 wherein at least one of the physical sensors is an accelerometer.

Example 59. The method of example 52 that incorporates the use of one or more gyroscopes.

Example 60. The method of example 52 that incorporates the use of one or more speakers.

Example 61. The method of example 52 that incorporates the use of one or more elements that can produce haptic or vibration responses.

Example 62. The method of example 52 that incorporates the combined use of a smartphone and a laptop, both of which can transmit and/or collect data simultaneously and can communicate with one another.

Example 63. The method of example 62 wherein a smartphone can communicate with a laptop by wireless communication.

Example 64. The method of example 63 wherein a smartphone can communicate with a laptop by secure and/or encrypted communication Example 65. The method of example 52 that makes use of a trusted clock.

Example 66. The method of example 52 wherein sensor data is timestamped

Example 67. The method of example 52 wherein a computer program can generate and communicate data over a speaker or haptic response element or vibration response element Example 68. A method of example 67 wherein the data communicated incorporates random or pseudorandom information that is generated in real time Example 69. A method of example 52 wherein local seismic activity data is compared against accelerometer data as a vetting method Example 70. A method of example 52 wherein the sensors are located in a laptop and smart phone that communicate with one another and are placed on a surface in the vicinity of one another Example 71. A method of example 70 wherein data from multiple sensors and or transducers is used to generate a spatial approximation of the laptop and smartphone setup (for example including approximate distances and orientations between the laptop and smartphone)

Example 72. A method of example 70 wherein data from multiple sensors and or transducers is used determine noise/vibration absorption and transmission properties of the surface on which the laptop and smartphone are placed Unless contrary to physical possibility, it is envisioned that (i) the methods/steps described herein may be performed in any sequence and/or in any combination, and that (ii) the components of respective embodiments may be combined in any manner.

The machine-implemented computational and control operations described above can be implemented by pro- grammable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
    generating a plurality of first cryptographic digital signatures associated with a set of typed characters, the set of typed characters having been input by use of a physical keyboard that is part of or in direct communication with a first processing device, wherein generating the plurality of first cryptographic digital signatures includes, for each of a plurality of keystrokes on the physical keyboard:
        detecting a motion associated with a pressing of a particular key on the physical keyboard, wherein the particular key is associated with a particular character, said detecting including receiving first spatially dependent sensory data resulting from the plurality of characters being typed on the physical keyboard, by using a distributed array of sensor devices and verifying that the typed characters have been generated by a physical typing of keys on the physical keyboard, based on the first spatially dependent sensory data;
        generating a first cryptographic digital signature associated with the particular character in response to detecting the motion associated with the pressing of the particular key; and
        providing a typed character and an associated one of the first cryptographic digital signatures to a first verification entity located within the first processing device, for verification of a physical keystroke;
    accessing a spatial mapping associated with a physical keyboard, the spatial mapping being based on second spatially-dependent sensory data associated with the physical keyboard, the second spatially-dependent sensory data being dependent on a position and orientation of the physical keyboard; and
    wherein verifying that the typed characters have been generated by a physical typing of keys on the physical keyboard is based on a comparison of the first spatially-dependent sensory data and the spatial mapping.

2. A method as recited in claim 1, wherein generating the plurality of first cryptographic digital signatures is performed by at least one hardware security module within the keyboard.

3. A method as recited in claim 2, wherein the at least one hardware security module generates the plurality of first cryptographic digital signatures by using a private key associated with the at least one hardware security module.

4. A method as recited in claim 1, wherein the detecting is performed by a plurality of key-press sensors contained within the physical keyboard, each of the plurality of key-press sensors being uniquely associated with a different one of the plurality of physical keys of the keyboard.

5. A method as recited in claim 4, wherein each of the sensors is embedded within a separate one of a plurality of hardware security modules, each of the hardware security modules being uniquely associated with a different one of the plurality of physical keys of the keyboard.

6. A method as recited in claim 1, further comprising, prior to sending each typed character to the first verification entity, encrypting the typed character.

7. A method as recited in claim 1, further comprising:
    verifying, by the first verification entity, each of the first cryptographic digital signatures; and
    in response to successfully verifying each of the first cryptographic digital signatures,
        creating a bundle of text representing the set of typed characters;
        generating, by the first verification entity, a second cryptographic digital signature corresponding to the bundle of text; and
        sending, by the first verification entity, the second cryptographic digital signature and the bundle of text or data representing the bundle of text to a second verification entity that is external to the first processing device, for verification.

8. A method as recited in claim 7, further comprising:
    receiving, by the first verification entity from the second verification entity, a verification party level digital signature that has been associated with the bundle of text by the second verification entity, in response to a successful verification by the second verification entity.

9. A method as recited in claim 8, further comprising:
    associating the verification party level digital signature with the set of typed characters; and
    making the set of typed characters in association with the verification party level digital signature accessible to a third-party consumer entity, wherein the verification party level digital signature is for use by the consumer entity to verify that the set of typed characters was typed by a human.

10. A method as recited in claim 7, further comprising, in response to successfully verifying each of the first cryptographic digital signatures:
    generating, by the first verification entity, at least one of i) a hash of the bundle of text, or ii) an encrypted version of the bundle of text, wherein the second cryptographic digital signature is a cryptographic digital signature of the hash or the encrypted version of the bundle of text; and
    sending, by the first verification entity, the hash or the encrypted version of the bundle of text in association with the second cryptographic digital signature to a second verification entity that is external to the first processing device, for verification.

11. A method as recited in claim 7, further comprising, prior to generating the bundle of text, decrypting each of the typed characters, by the first verification entity.

12. A method as recited in claim 1, wherein detecting the motion associated with the pressing of a particular key on the physical keyboard comprises:
    generating sensor data by using a plurality of sound or vibration sensors located within the physical keyboard, the sensor data being indicative of a physical key press.

13. A method as recited in claim 12, wherein the plurality of sensors include at least one accelerometer and at least one microphone.

14. A method as recited in claim 12, wherein the plurality of sensors include a plurality of microphones.

15. A method as recited in claim 12, wherein each of the plurality of sound or vibration sensors is contained within a separate one of a plurality of hardware security modules located within the physical keyboard, each of the hardware security modules being configured to generate a digital signature representative of a keystroke.

16. A method as recited in claim 12, further comprising using data from the sensors to triangulate the approximate locations of instances of key presses and comparing triangulated approximate locations of instances of key presses with recorded digital text generated concurrently with each key press.

17. A method as recited in claim 1, wherein the first and second spatially-dependent sensory data each include at least one of sound data or vibration data.

18. A method as recited in claim 1, wherein the verifying comprises comparing data of sounds or vibrations generated by each of a plurality of distinct key presses to data of a prerecorded set of sounds or vibrations generated by a physical typing on the physical keyboard.

19. A method as recited in claim 1, wherein at least one of the plurality of sensors is located in a second processing device that is located proximate to the first processing device during performance of the method.

20. A method as recited in claim 1, wherein the plurality of sensors include at least one accelerometer and at least one microphone.

21. A method as recited in claim 1, further comprising using at least one speaker to generate sound for detection by at least one microphone.

22. A method as recited in claim 1, wherein the plurality of sensors include a plurality of microphones.

23. A method as recited in claim 1, further comprising using the first spatially-dependent sensory data to triangulate the approximate locations of instances of key presses and comparing triangulated approximate locations of instances of key presses with recorded digital text generated concurrently with each key press.

24. A system comprising:
   at least one key-press sensor and at least one processor collectively configured to perform a process comprising:
      generating a plurality of first cryptographic digital signatures associated with a set of typed characters, the set of typed characters having been input by use of a physical keyboard that is part of or in direct communication with a first processing device, wherein generating the plurality of first cryptographic digital signatures includes, for each of a plurality of keystrokes on the physical keyboard:
         detecting a motion associated with a pressing of a particular key on the physical keyboard, wherein the particular key is associated with a particular character, said detecting including receiving first spatially dependent sensory data resulting from the plurality of characters being typed on the physical keyboard, by using a distributed array of sensor devices and verifying that the typed characters have been generated by a physical typing of keys on the physical keyboard, based on the first spatially dependent sensory data;
         generating a first cryptographic digital signature associated with the particular character in response to detecting the motion associated with the pressing of the particular key; and
         providing a typed character and an associated one of the first cryptographic digital signatures to a first verification entity located within the first processing device, for verification of a physical keystroke;
      accessing a spatial mapping associated with a physical keyboard, the spatial mapping being based on second spatially-dependent sensory data associated with the physical keyboard, the second spatially-dependent sensory data being dependent on a position and orientation of the physical keyboard; and
      wherein verifying that the typed characters have been generated by a physical typing of keys on the physical keyboard is based on a comparison of the first spatially-dependent sensory data and the spatial mapping.

25. A system as recited in claim 24, wherein the at least one processor comprises at least one hardware security module.

26. A system as recited in claim 24, wherein the set of at least one key-press sensor and at least one processor comprises a plurality of plurality of key-press sensors and a plurality of hardware security modules, each of the plurality of key-press sensors is dedicated to detecting a key press of a different key of the plurality of keys, and each of the plurality of key-press sensors is contained within a separate one of the plurality of hardware security modules.

27. A keyboard comprising:
   a housing;
   a plurality of physical keys, each assigned to at least one character of a character set;
   a plurality of key-press sensors contained within the housing, each of the key-press sensors disposed to detect pressing of at least one of the plurality of physical keys and each disposed to provide a separate output signal of a plurality of output signals; and
   at least one hardware security module contained within the housing to receive the plurality of output signals, the at least one hardware security module being configured to generate a plurality of cryptographic digital signatures for, respectively, a plurality of physical keystrokes on the keyboard, by:
   for each of the plurality of physical keystrokes on the keyboard,
      detecting a motion associated with a pressing of a particular key on the keyboard, wherein the particular key is associated with a particular character, said detecting including receiving first spatially dependent sensory data resulting from the plurality of characters being typed on the physical keyboard, by using the plurality of key-press sensors and verifying that the typed characters have been generated by a physical typing of keys on the physical keyboard, based on the first spatially dependent sensory data;
      identifying which key of the plurality of physical keys is the particular key;
      generating a cryptographic digital signature associated with the particular character in response to detecting the motion associated with the pressing of the particular physical key; and
      providing the cryptographic digital signature to a verification entity located external to the keyboard, for verification of a physical keystroke,
   the hardware security module further configured to:
   access a spatial mapping associated with a physical keyboard, the spatial mapping being based on second spatially-dependent sensory data associated with the physical keyboard, the second spatially-dependent sensory data being dependent on a position and orientation of the physical keyboard; and wherein verifying that the typed characters have been generated by a physical typing of keys on the physical keyboard is based on a comparison of the first spatially-dependent sensory data and the spatial mapping.

28. A keyboard as recited in claim 27, wherein each of the plurality of key-press sensors comprises a magnetic field sensor.

29. A keyboard as recited in claim 27, wherein each of the plurality of key-press sensors comprises a fluid within a container and a pressure sensor in contact with the fluid.

30. A keyboard as recited in claim 27, wherein each of the plurality of key-press sensors comprises a sound or vibration detector.

31. A keyboard as recited in claim 27, wherein the at least one hardware security module comprises a plurality of hardware security modules, each of the plurality of key-press sensors is dedicated to detecting a key press of a different key of the plurality of keys, and each of the plurality of key-press sensors is contained within a separate one of the plurality of hardware security modules.

\* \* \* \* \*